March 15, 1960 B. C. MILLER 2,928,158
APPARATUS FOR AND METHOD OF HEAT-TREATING ARTICLES
Filed Jan. 9, 1956 19 Sheets-Sheet 12
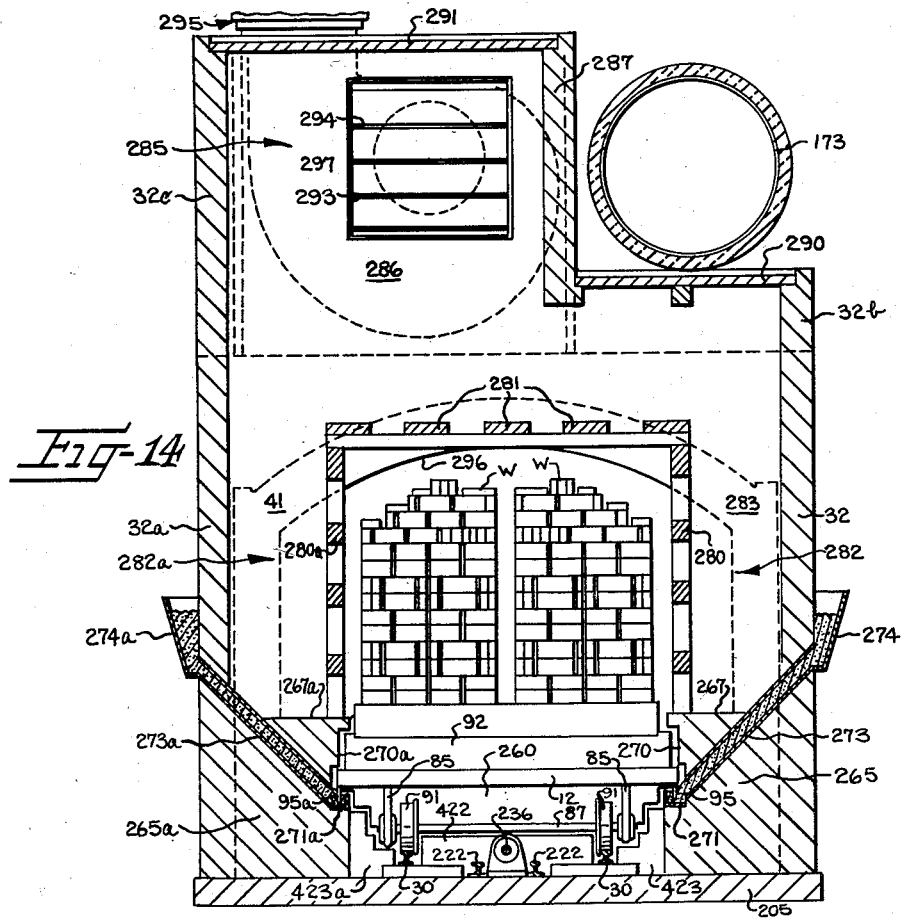
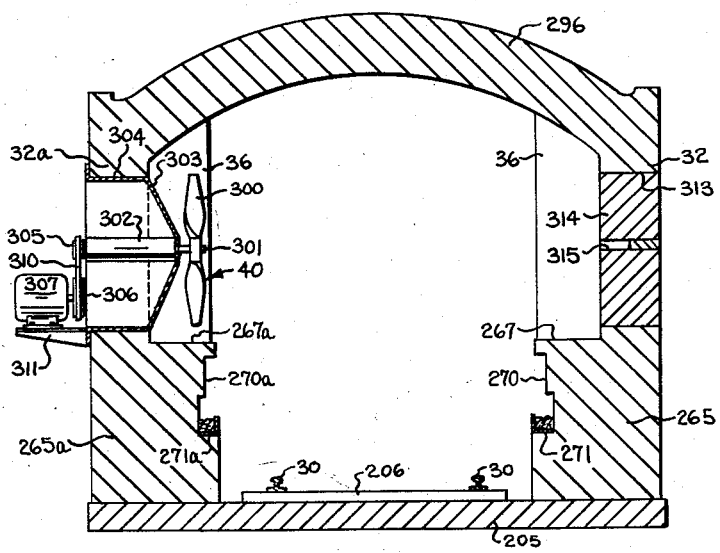
BOYD C. MILLER,
INVENTOR
BY Eaton + Bell
ATTORNEYS March 15, 1960    B. C. MILLER    2,928,158
APPARATUS FOR AND METHOD OF HEAT-TREATING ARTICLES
Filed Jan. 9, 1956    19 Sheets-Sheet 13

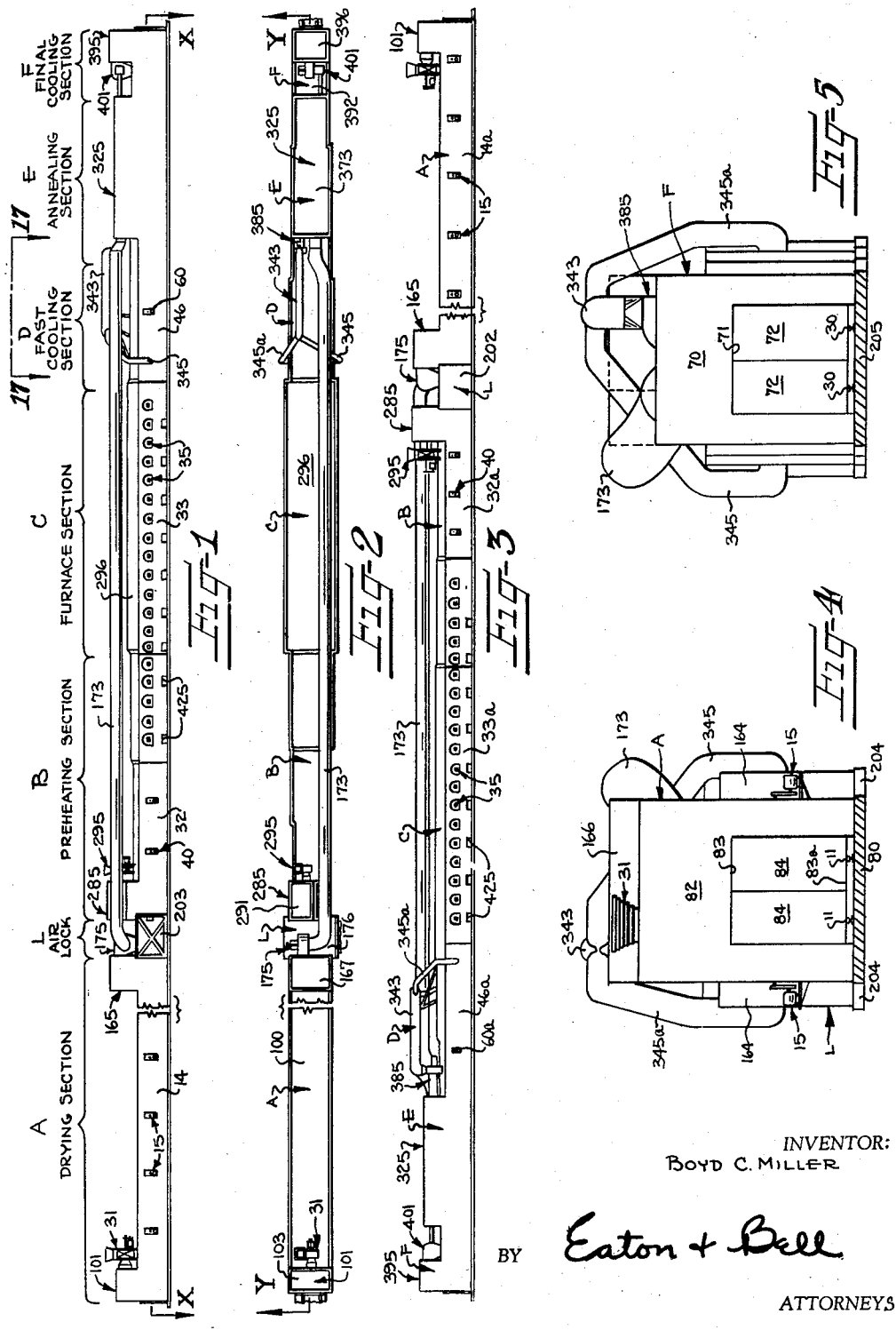

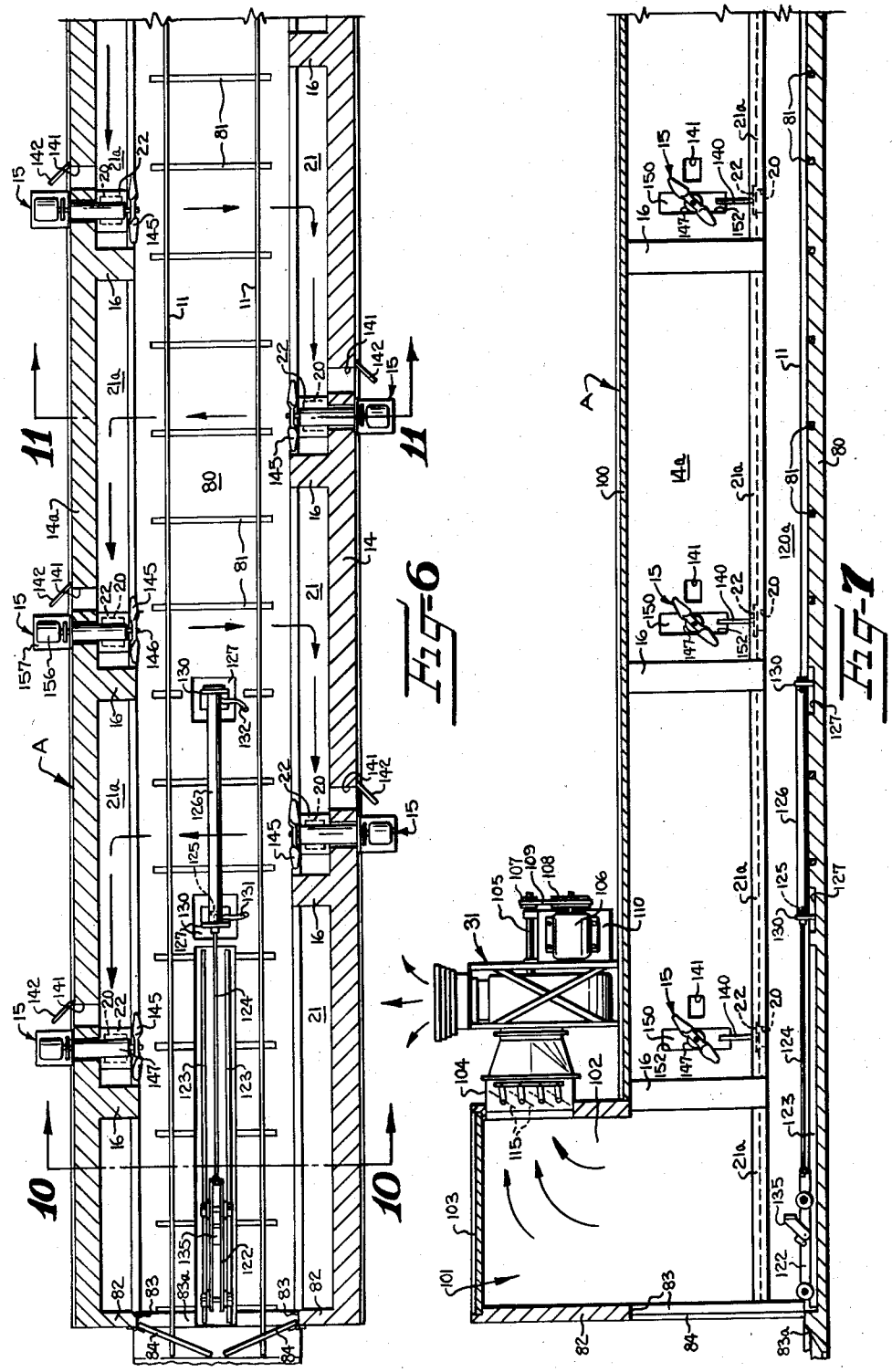

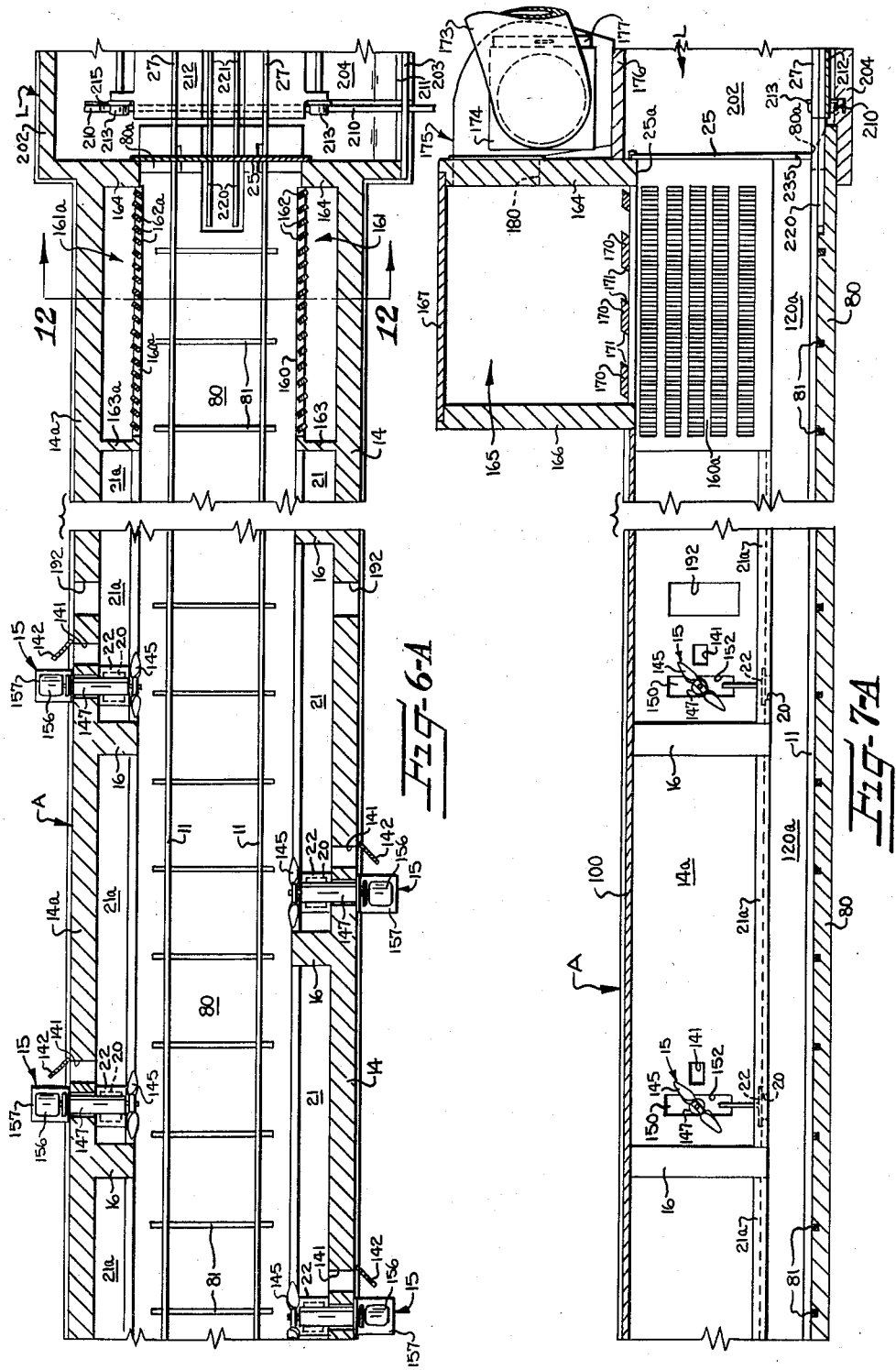

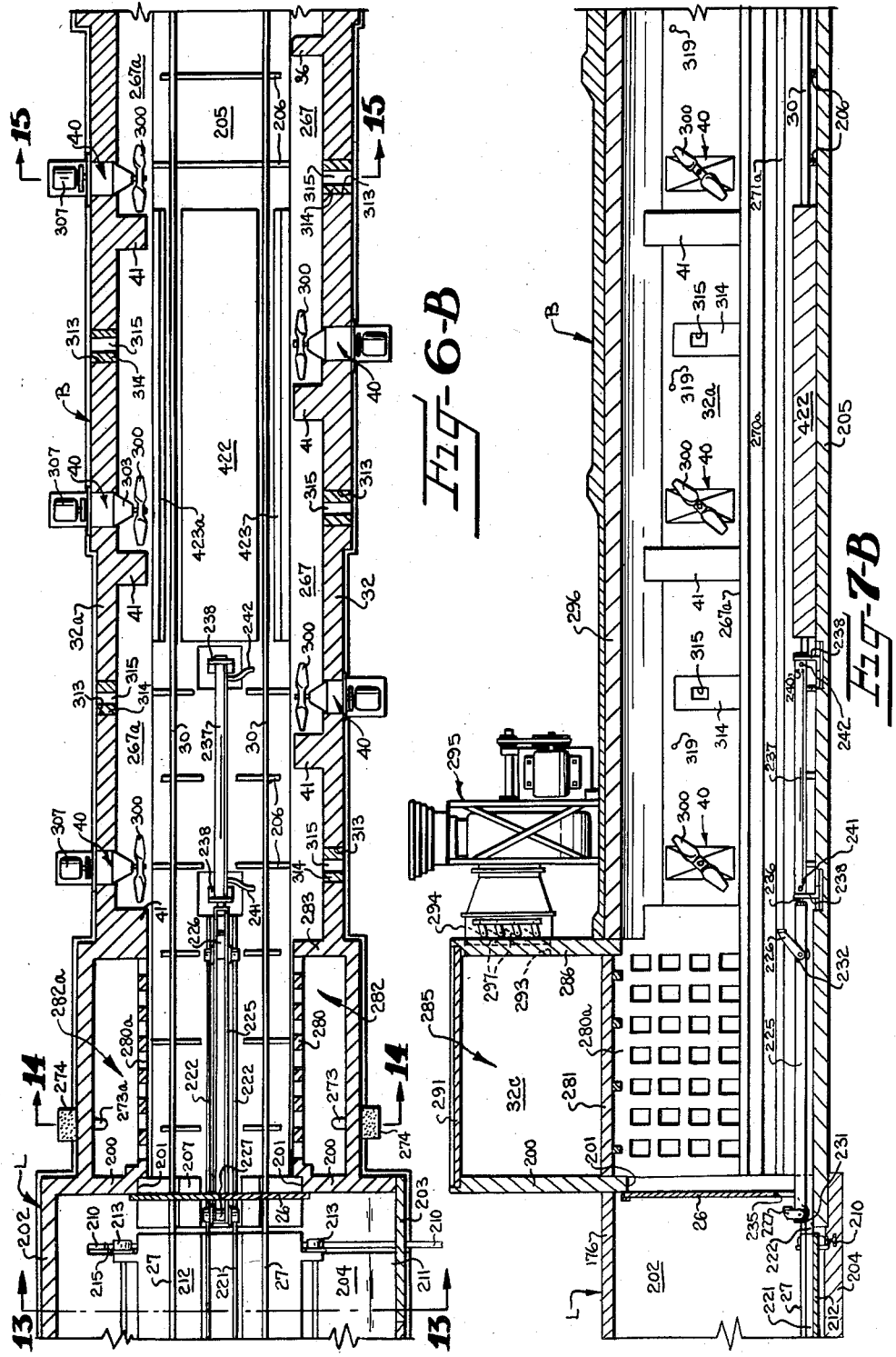

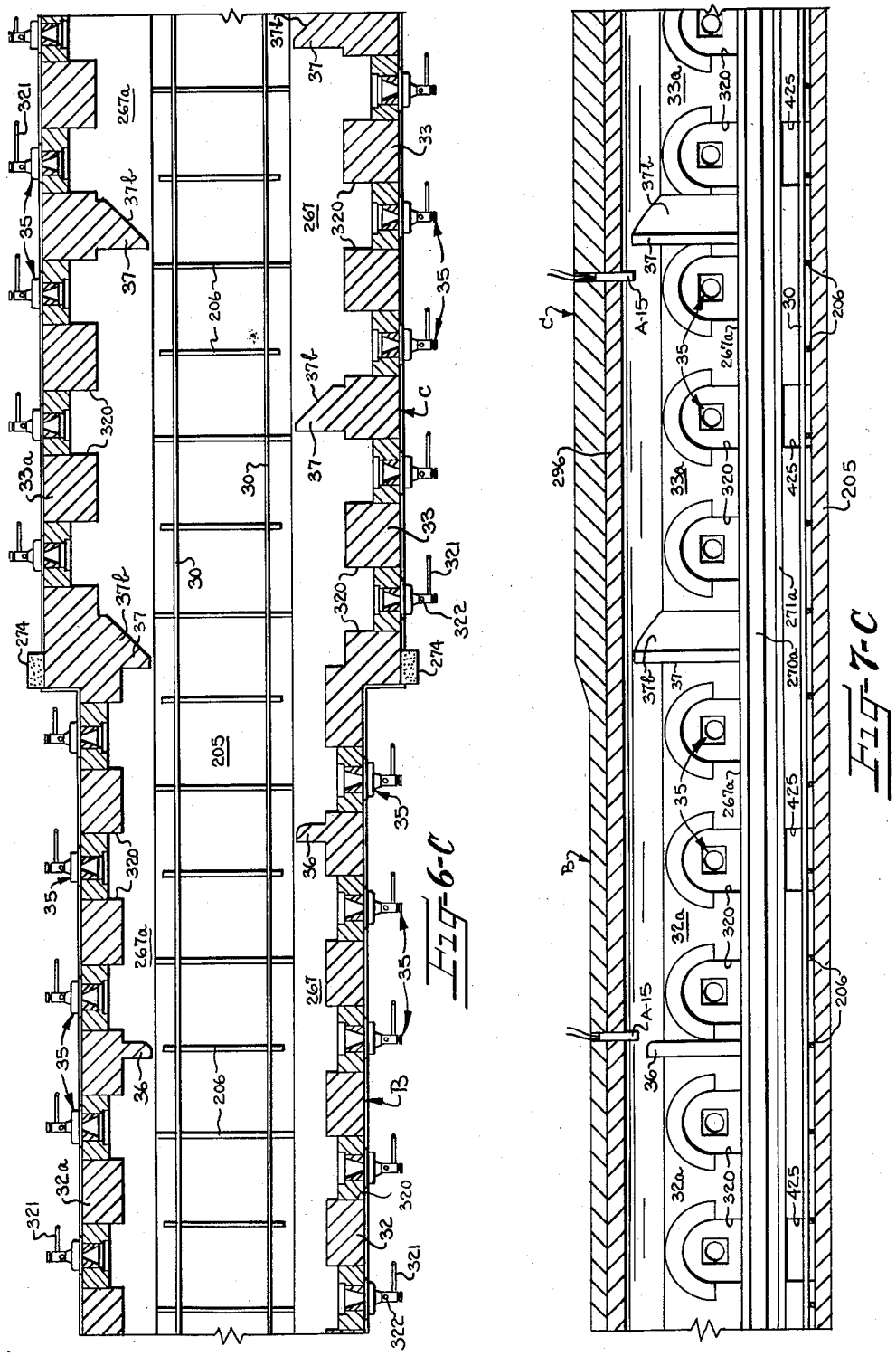

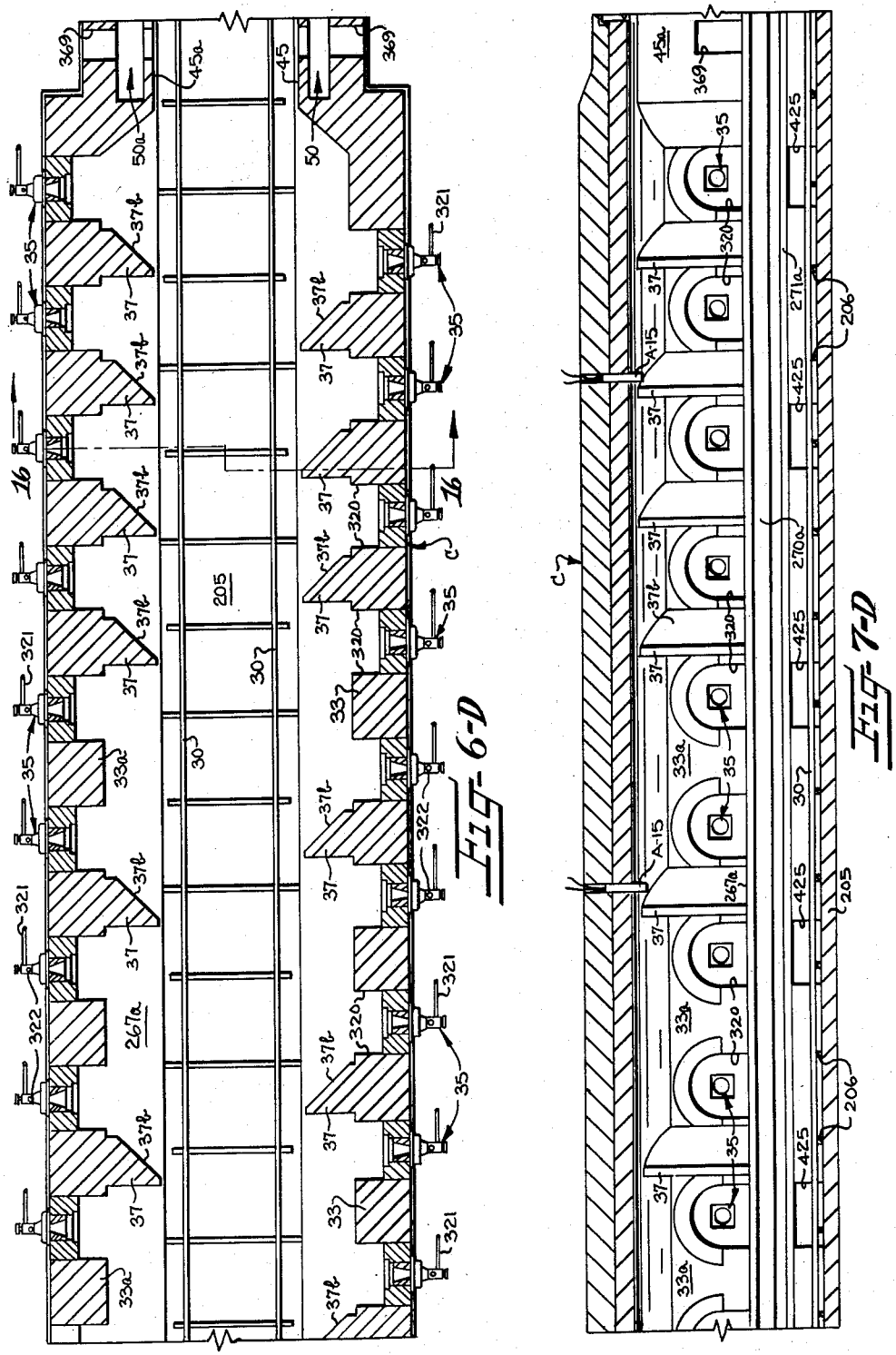

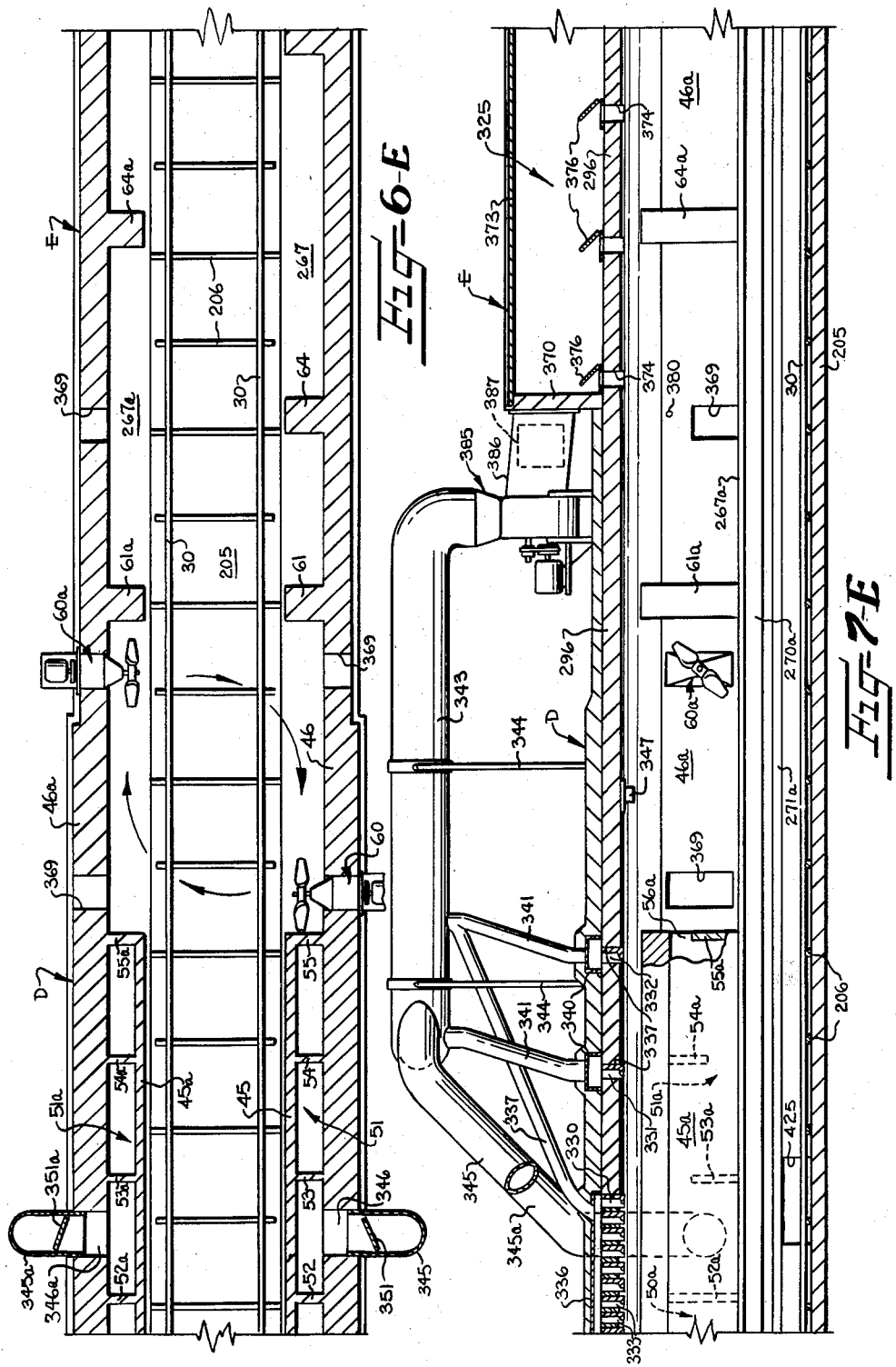

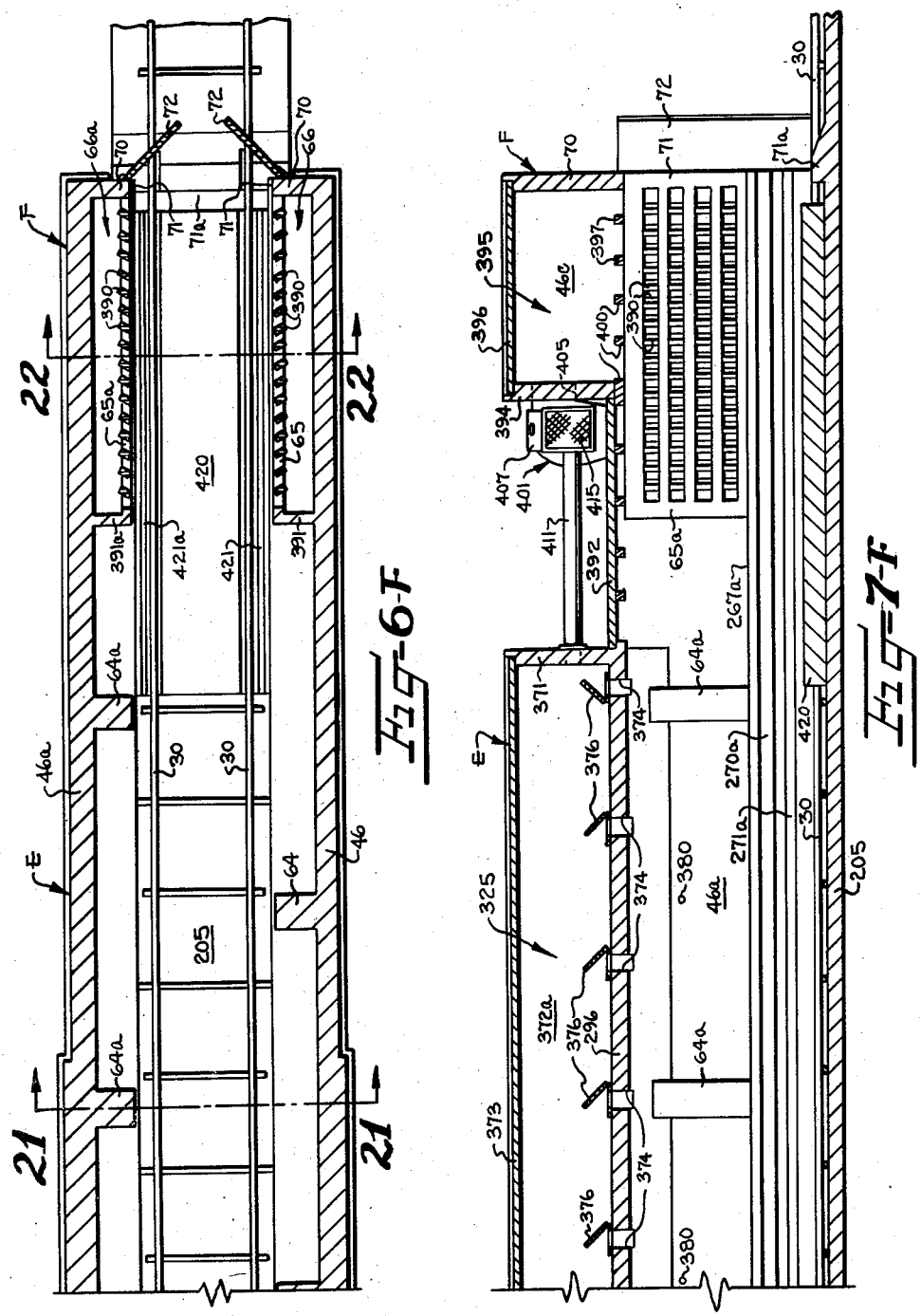

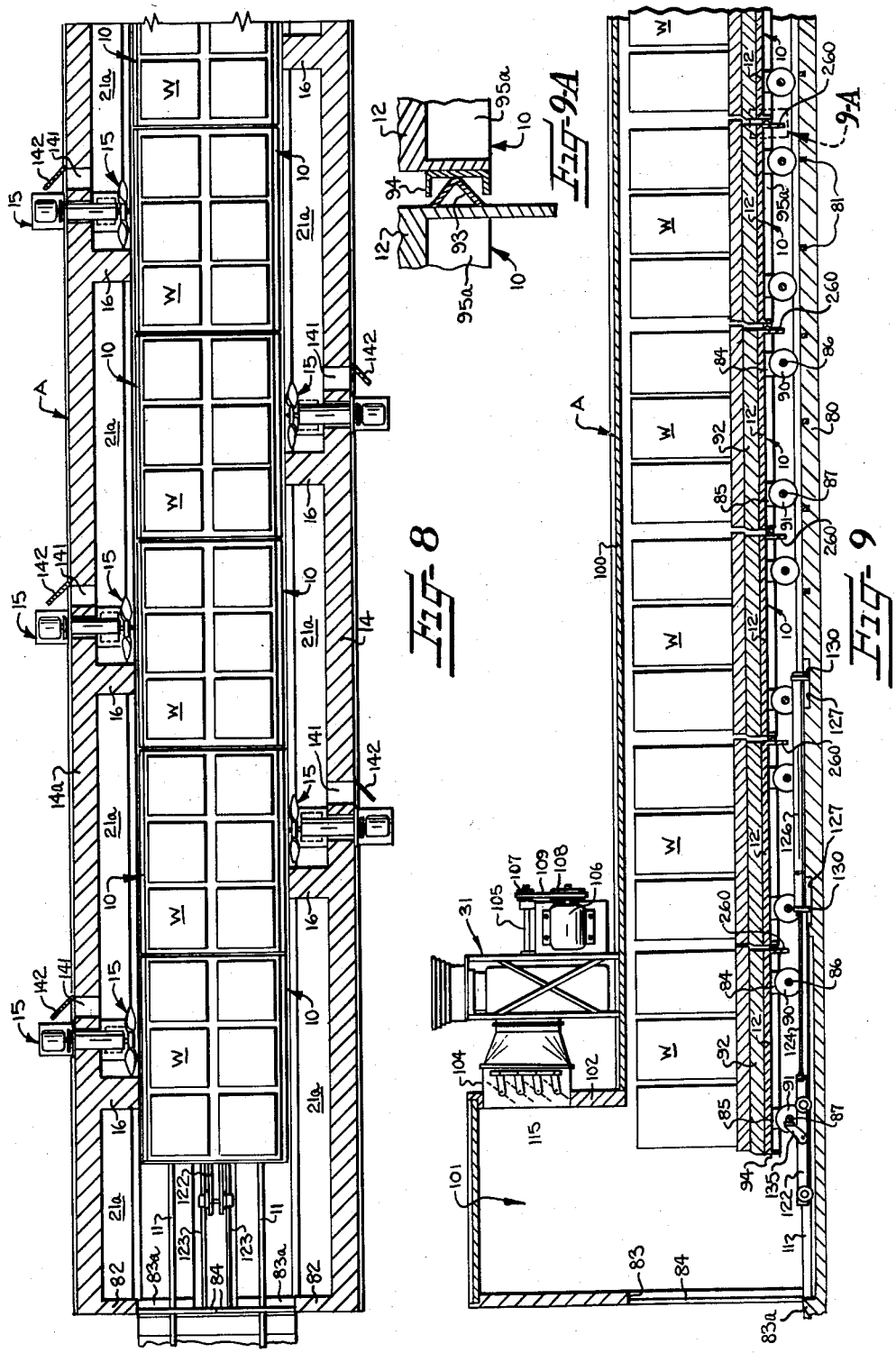

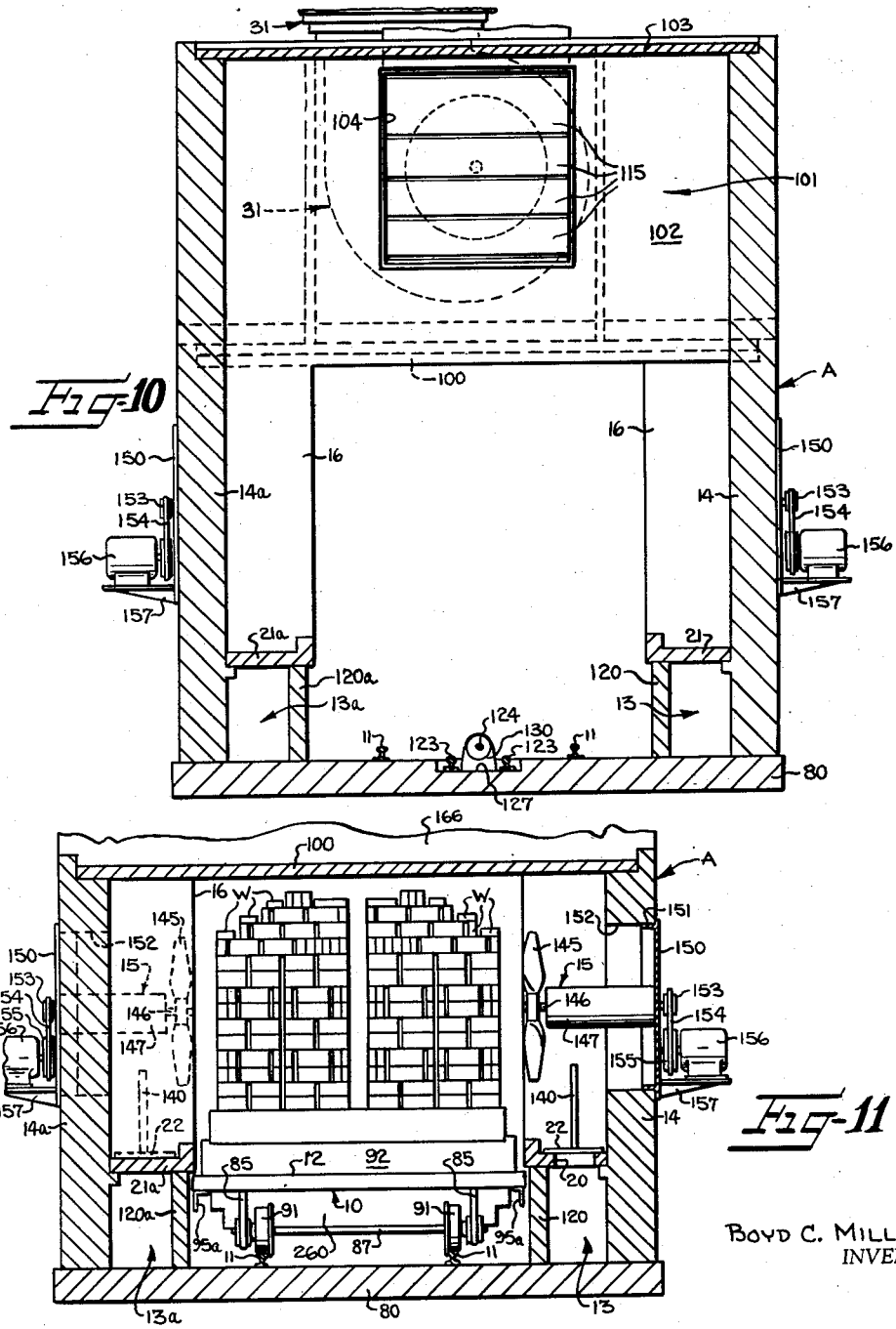

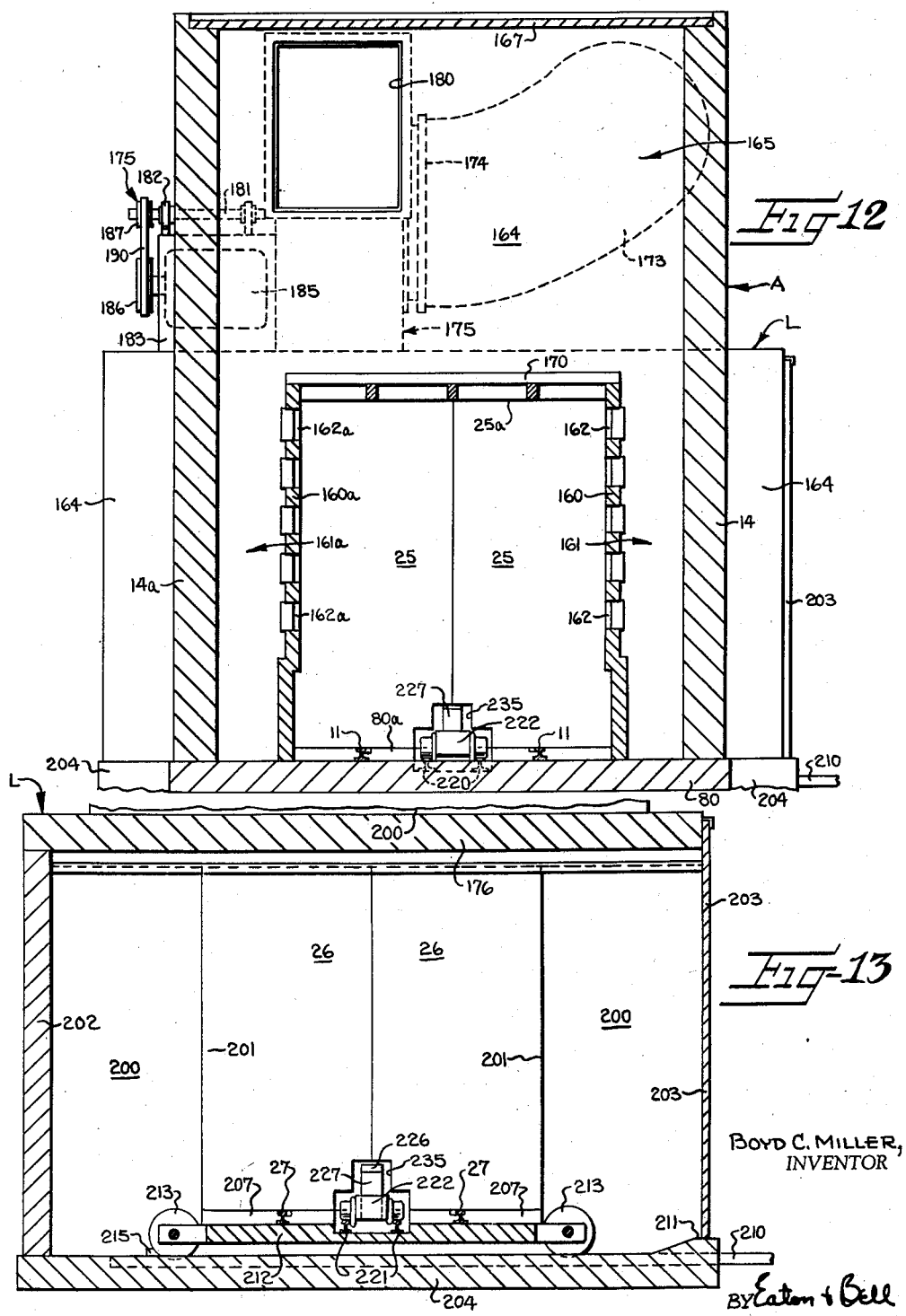

BOYD C. MILLER,
INVENTOR

BY Eaton + Bell
ATTORNEYS

March 15, 1960     B. C. MILLER     2,928,158
APPARATUS FOR AND METHOD OF HEAT-TREATING ARTICLES
Filed Jan. 9, 1956     19 Sheets-Sheet 14
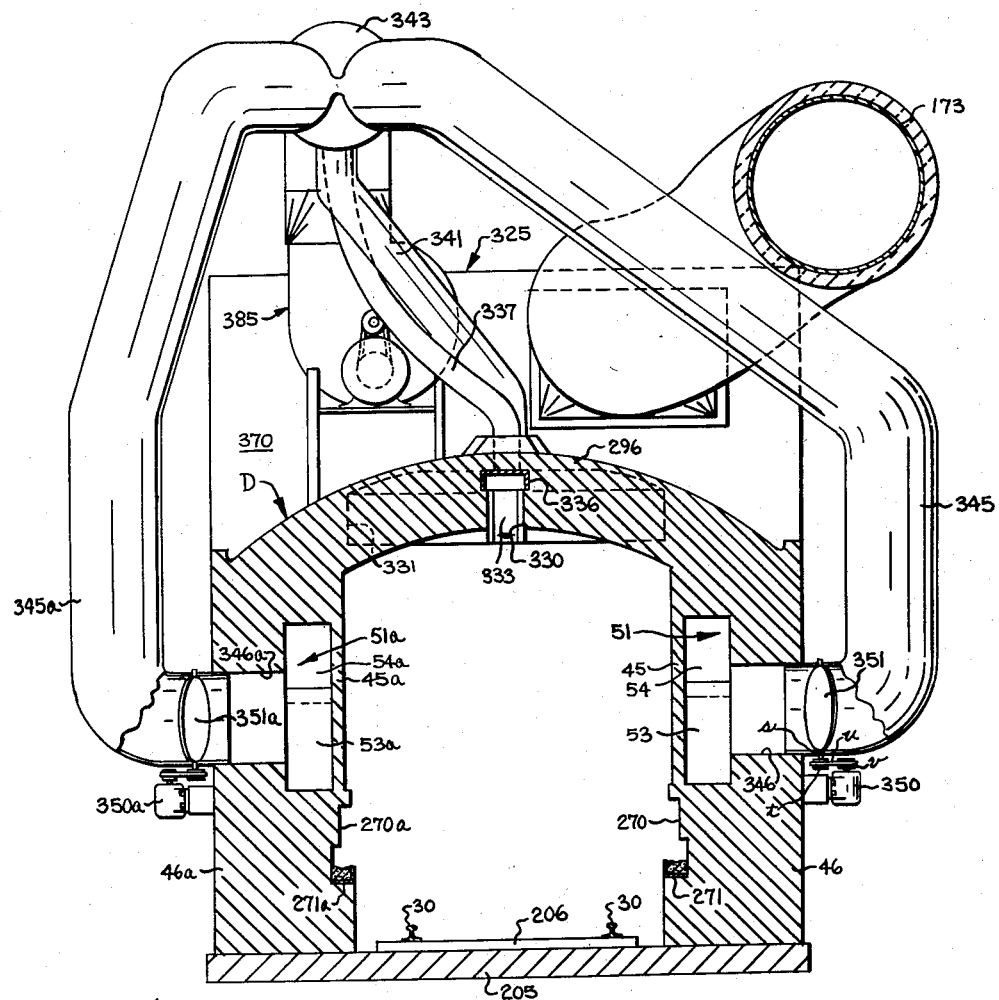
Fig-18
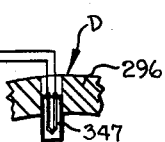
Fig-19
BOYD C. MILLER,
INVENTOR
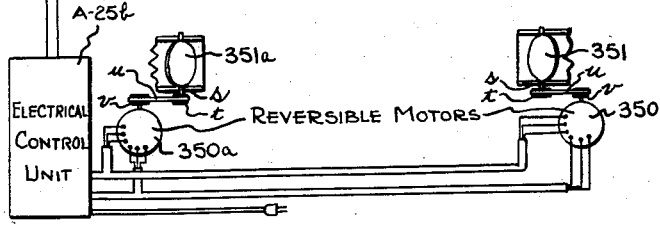
BY Eaton & Bell
ATTORNEYS

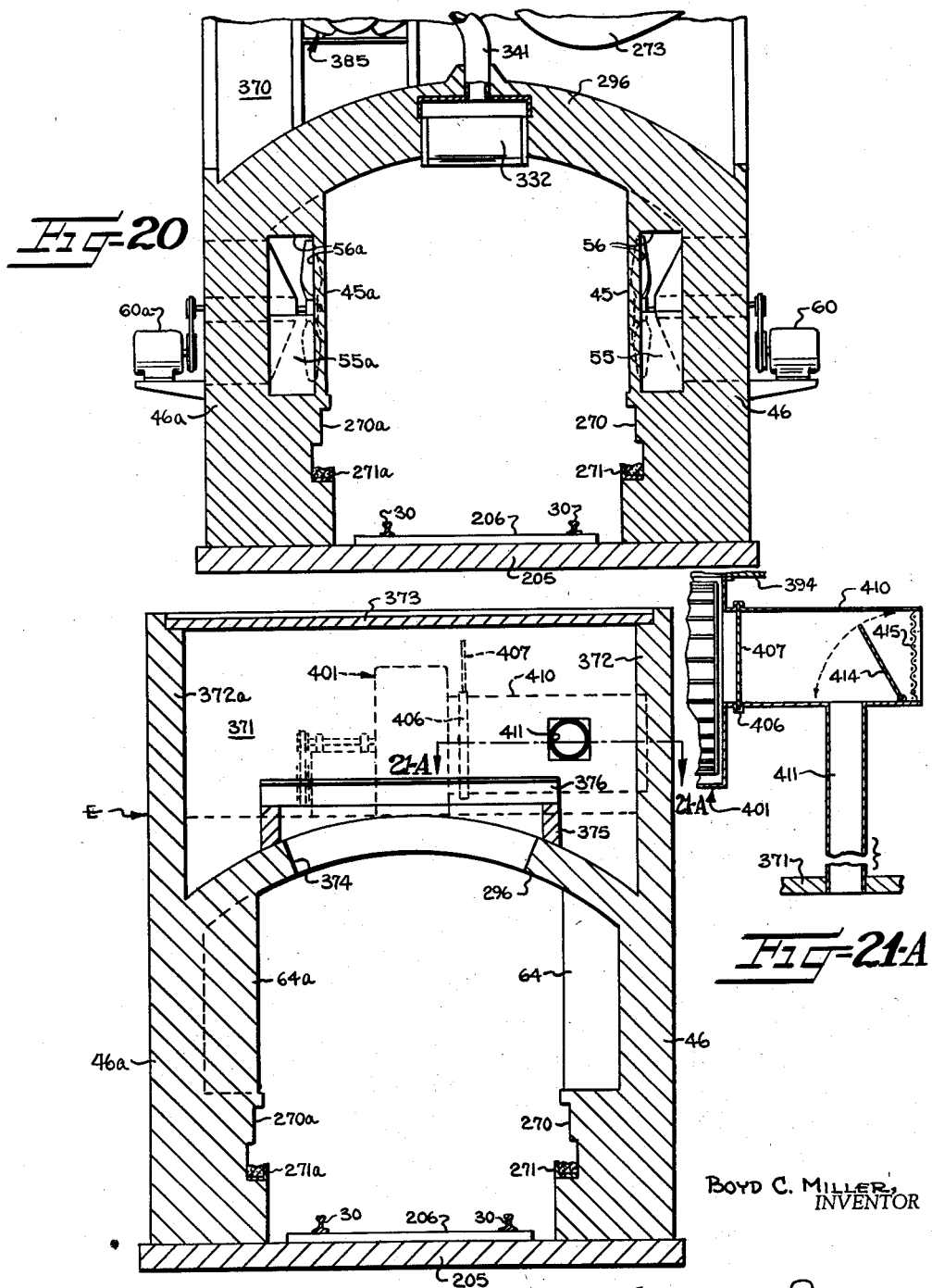

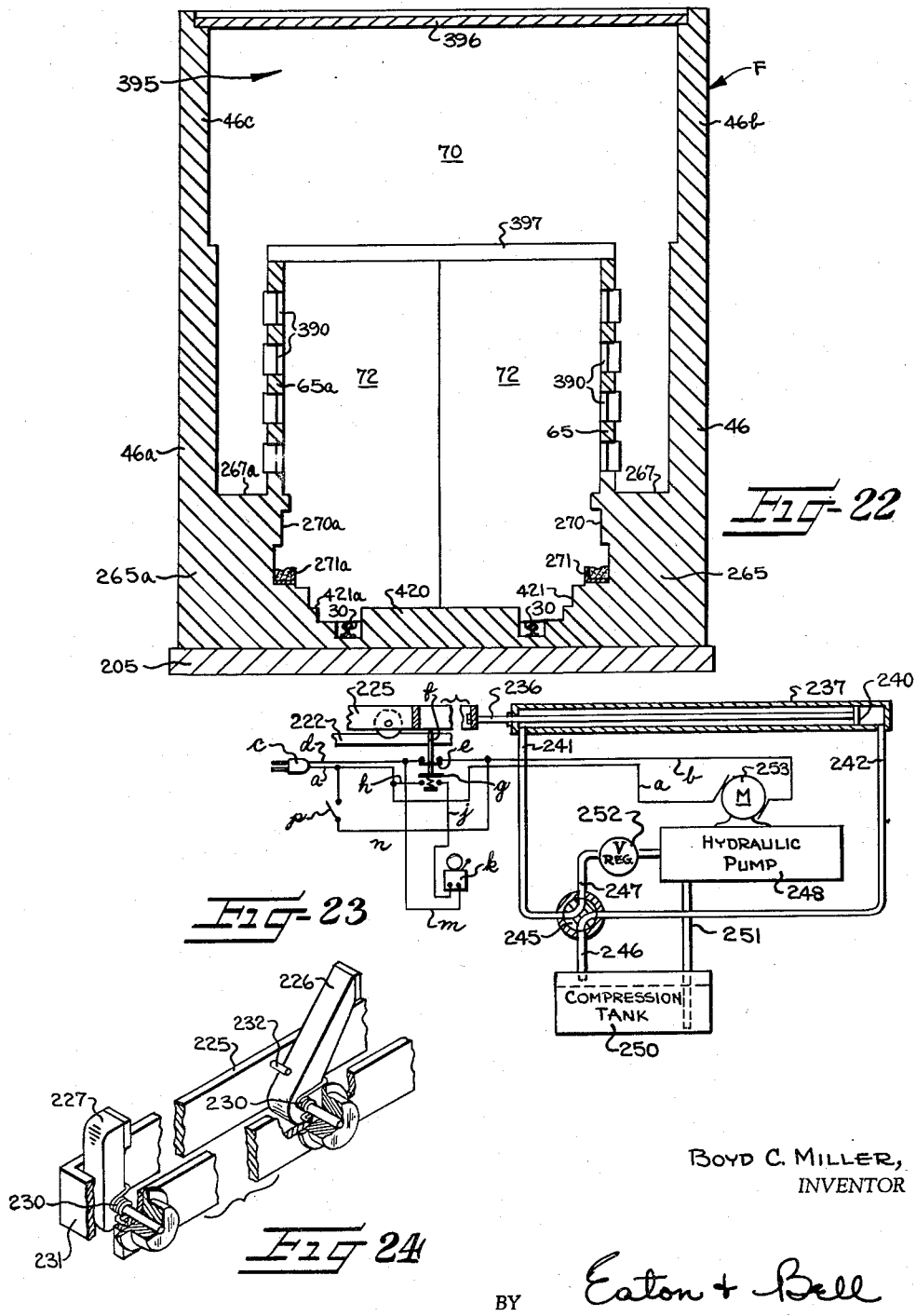

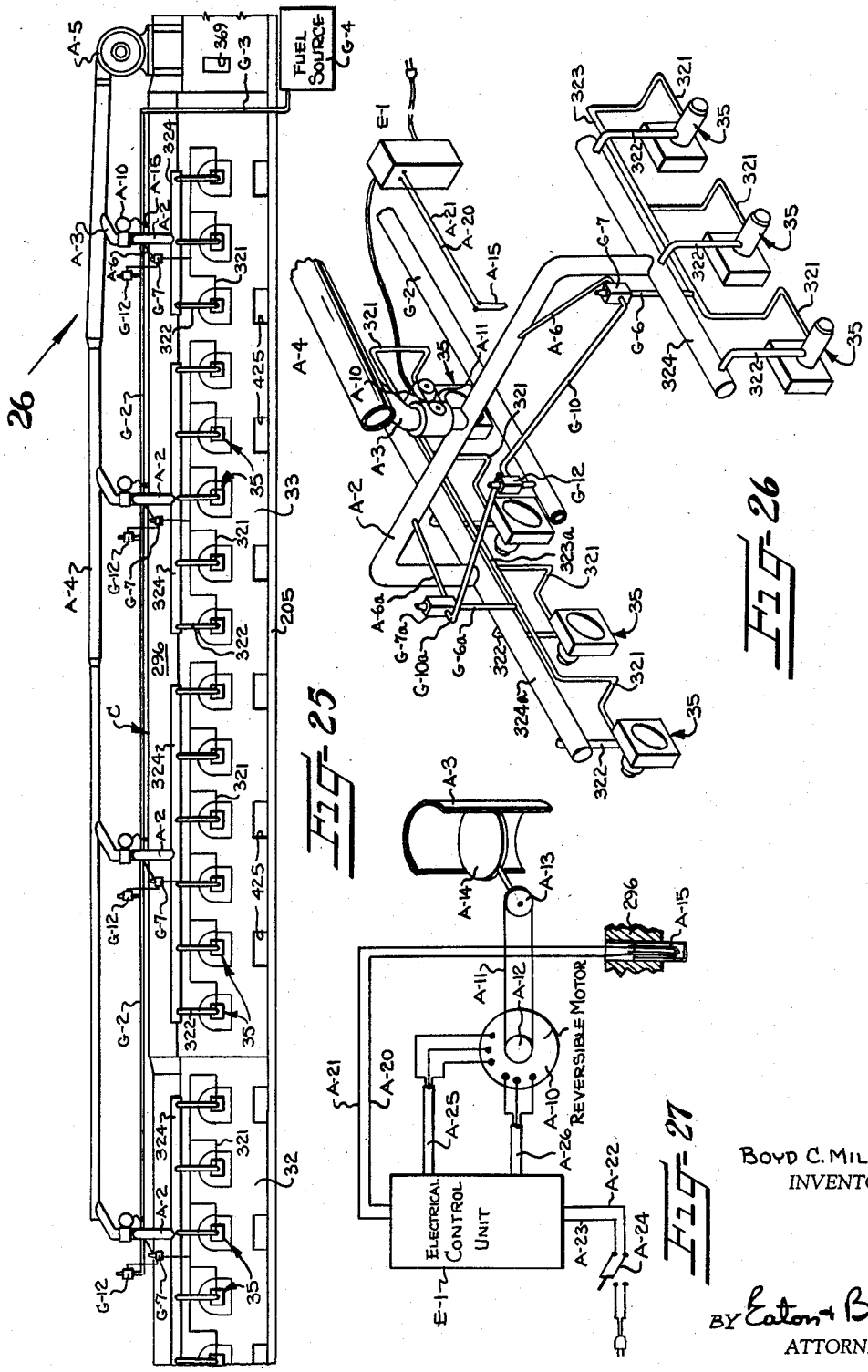

March 15, 1960 B. C. MILLER 2,928,158
APPARATUS FOR AND METHOD OF HEAT-TREATING ARTICLES
Filed Jan. 9, 1956 19 Sheets-Sheet 18
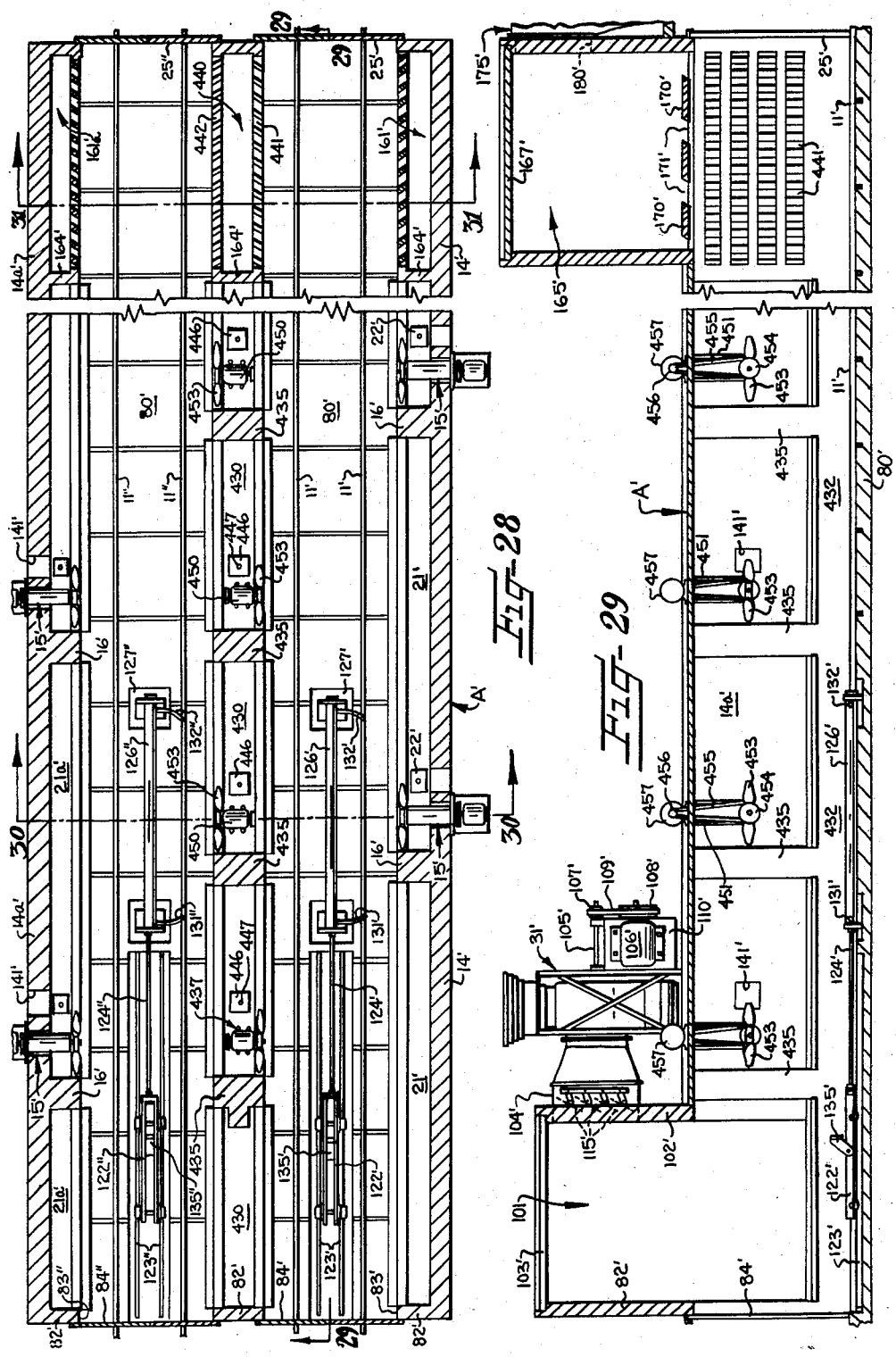

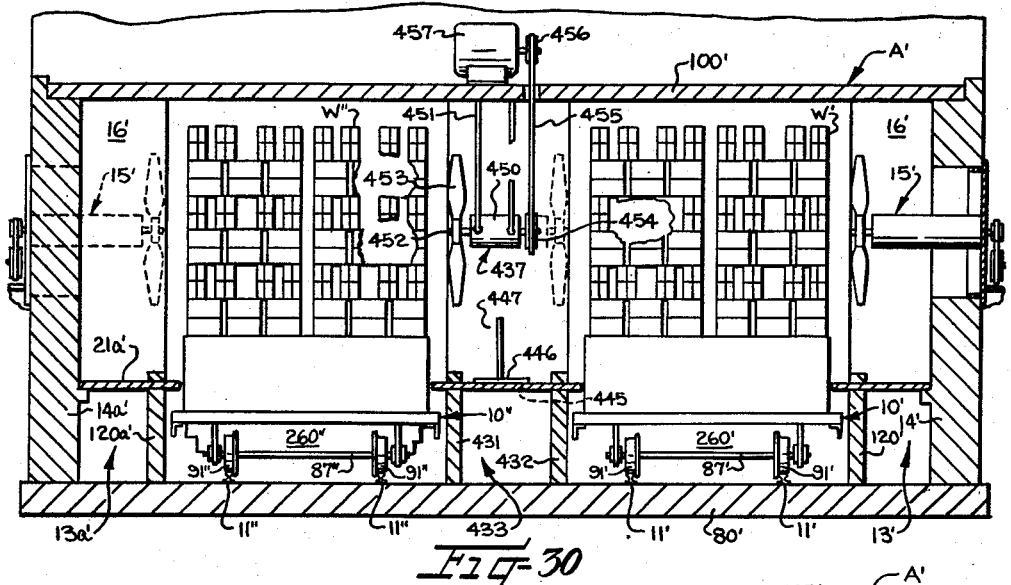
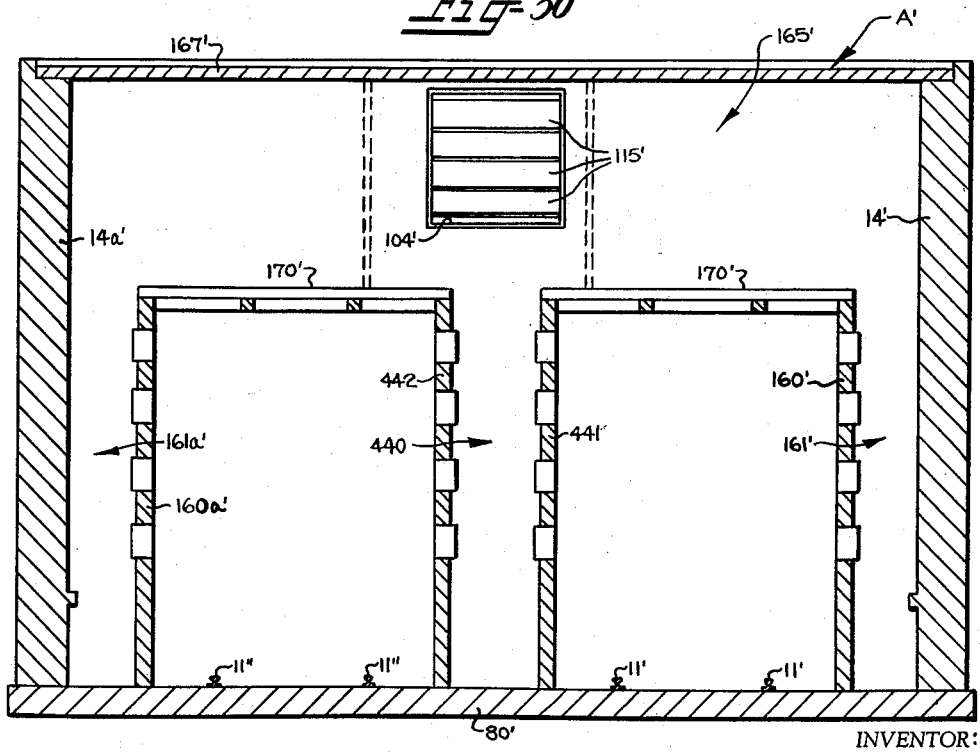

United States Patent Office 2,928,158
Patented Mar. 15, 1960

2,928,158

APPARATUS FOR AND METHOD OF HEAT-TREATING ARTICLES

Boyd C. Miller, Salisbury, N.C.

Application January 9, 1956, Serial No. 558,124

5 Claims. (Cl. 25—142)

This invention generally relates to the art of heat-treating articles, such as are made from ceramic materials, plastics, steel or other metals, and is particularly concerned with an improved apparatus for and method of controlling the temperature, humidity and direction and course of flow of air currents in an elongated enclosure or tunnel-type of kiln. The ware subjected to the present method shall be referred to hereinafter as brick, by way of example. However, it is to be distinctly understood that the improved apparatus and method may be used in the processing of other ceramic materials or articles made from any material capable of being heat-treated.

It is the primary object of this invention to provide an improved apparatus for and method of heat-treating brick and other ware on a relatively high production basis as the ware is passed longitudinally through a tunnel-type kiln wherein air is maintained at predetermined temperatures in particular zones of the kiln, but wherein the temperature is varied in the different zones according to the requirements of the process, wherein the air is maintained at a predetermined relative humidity, which is extremely important in the treatment of brick, and wherein the air is moved in a sinuous or serpentine path throughout the length of or any given portion of kiln so that all of the brick or other articles moved through the tunnel are uniformly treated and respond to the temperature and humidity conditions of the surrounding atmosphere at a much faster rate than has been attainable heretofore.

It is another object of this invention to provide a tunnel-type kiln having means for carrying out the above process wherein cars or other conveyor means are moved longitudinally of the kiln at predetermined speeds while supporting the ware thereon and opposite side walls of the tunnel are spaced substantially equi-distant from opposite sides of the ware as it moves through the tunnel.

The side walls of the kiln are provided with inwardly projecting baffles or columns whose inner surfaces terminate closely adjacent the path of travel of the ware thereby, the baffles on one side wall being staggered relative to the baffles on the other side wall with strategically positioned forced air outlets and inlets being provided so the air tends to move generally in the opposite direction from that in which the ware is moved, the baffles causing the air to flow across the tunnel from one side wall to the other in a sinuous or serpentine path toward and through the corresponding air outlet.

It is another object of this invention to provide circulating fans adjacent certain of the baffles for forcing the air across the tunnel and through the ware and, since the baffles and circulating fans are staggered, upon the air being forced across the tunnel by any one of the circulating fans, it traverses the opposite wall and is directed back across the tunnel in the opposite direction by the next adjacent of said fans, etc.

Some of the objects of the invention having been stated, other objects will appear as the description proceeds when taken in connection with the accompanying drawings, in which—

Figure 1 is a somewhat schematic side elevation of a tunnel-type kiln embodying the means for carrying out the improved heat-treating process, and particularly devised for the treatment of brick and similar ceramic materials;

Figure 2 is a top plan view of the apparatus shown in Figure 1;

Figure 3 is a view looking at the left-hand or opposite side of the kiln shown in Figure 1;

Figure 4 is an enlarged elevation of the ingress or feed end of the improved kiln looking at the left-hand side of Figure 1;

Figure 5 is an enlarged elevation of the discharge end of the improved kiln looking at the right-hand side of Figure 1;

Figure 16:
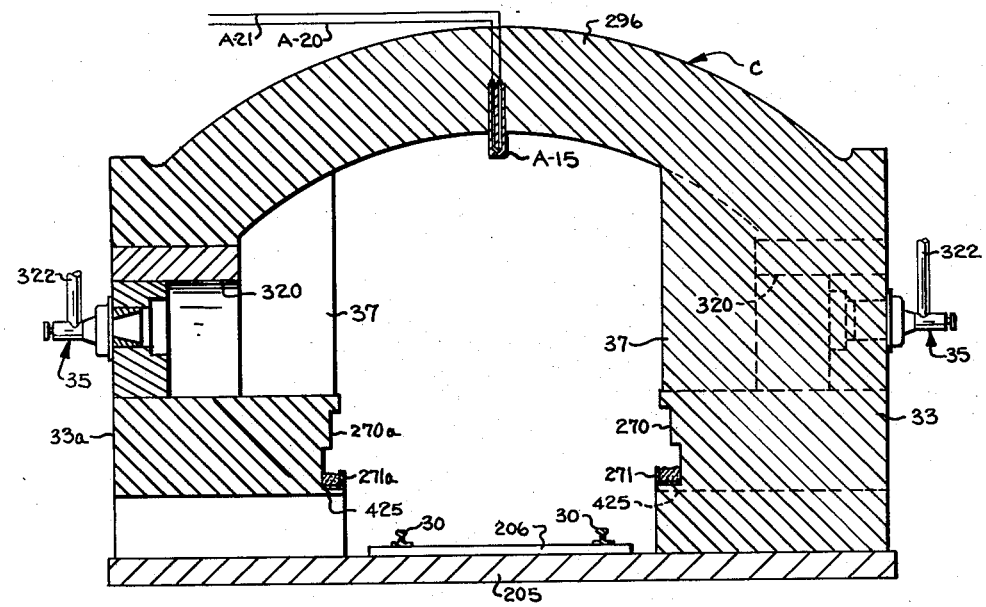
Figure 17:
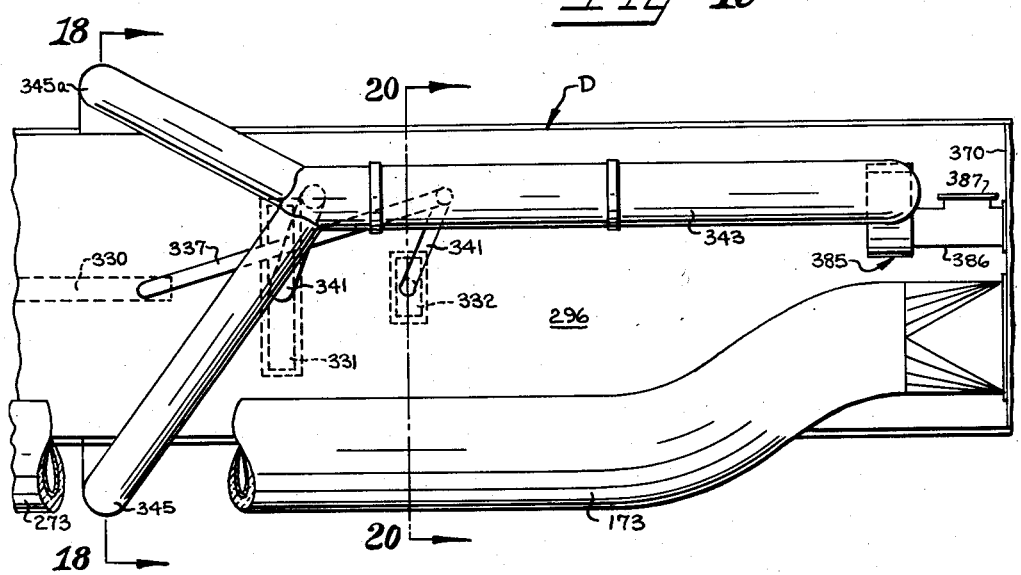

Figures 6 through 6–F are, collectively, an enlarged longitudinal sectional plan view through the improved tunnel kiln taken substantially along line X—X in Figure 1;

Figures 7 through 7–F are, collectively, an enlarged longitudinal vertical sectional view through the improved kiln taken substantially along line Y—Y in Figure 2;

Figure 8 is a plan view similar to Figure 6, but showing a series of cars supporting the ware positioned in the tunnel;

Figure 9 is a view similar to Figure 7, also showing the kiln cars positioned therein and on which the ware is supported;

Figure 10 is an enlarged transverse vertical sectional view through the preheating section of the kiln taken substantially along line 10—10 in Figure 6;

Figure 11 is another transverse vertical sectional view through the drying section of the kiln taken substantially along line 11—11 in Figure 6 and showing a car supporting brick thereon positioned within the tunnel;

Figure 12 is an enlarged transverse vertical sectional view through the kiln, adjacent the discharge end of the drying section thereof, taken substantially along line 12—12 in Figure 6–A and showing, in particular, how the hot air is forced from the slow-cooling section of the kiln into the drying section;

Figure 13 is another transverse vertical sectional view taken substantially along line 13—13 in Figure 6–B, and showing how the air lock chamber, interposed between the drying and preheating sections of the kiln, is constructed;

Figure 14 is an enlarged transverse vertical sectional view taken substantially along line 14—14 in Figure 6–B, adjacent the ingress end of the preheating section of the kiln, and showing a kiln car supporting a load of brick positioned therein;

Figure 15 is an enlarged transverse vertical sectional view taken substantially along line 15—15 in Figure 6–B and showing, in particular, how each of the circulating fans in the preheating section of the kiln is constructed;

Figure 16 is an enlarged transverse vertical sectional view through the furnace section or burning section of the kiln taken substantially along line 16—16 in Figure 6–D;

Figure 17 is an enlarged plan view of the fast-cooling section of the kiln, with parts broken away, taken substantially along line 17—17 in Figure 1, showing how the air is forced from the slow-cooling section into the fast-cooling section and also showing a portion of the duct for directing heated air from the slow-cooling section to the discharge end of the drying section of the kiln;

Figure 18 is an enlarged transverse vertical sectional view taken substantially along line 18—18 in Figure 17;

Figure 19 is a schematic view of an electrical circuit for controlling dampers at the fast-cooling section;

Figure 20 is an enlarged transverse vertical sectional view through the fast-cooling section taken substantially along line 20—20 in Figure 17, with the upper portion thereof broken away;

Figure 21 is an enlarged transverse vertical sectional view through the slow-cooling section of the kiln taken substantially along line 21—21 in Figure 6–F;

Figure 21–A is a fragmentary sectional plan view taken substantially along line 21–A—21–A in Figure 21;

Figure 22 is an enlarged transverse vertical sectional view through the final or atmospheric cooling section of the kiln taken substantially along line 22—22 in Figure 6–F;

Figure 23 is a schematic electrical and piping diagram showing how the advancing means at the drying and preheating sections may be controlled;

Figure 24 is an isometric view of the kiln car-transfer dolly shown in the left-hand portions of Figures 6–B and 7–B, with parts broken away;

Figure 25 is a somewhat enlarged schematic elevation of a rear portion of the preheating section and the furnace section shown in the central portion of Figure 1, and illustrating how air may be forced into the burners when gaseous fuel is used and also showing the automatic controls for the fuel burners;

Figure 26 is an enlarged isometric view looking generally in the direction of the arrow indicated at 26 in Figure 25, omitting the corresponding portion of the furnace section proper and showing more in detail the controls for the corresponding group or bank of fuel burners;

Figure 27 is a schematic wiring diagram showing how the damper or one of the groups of burners is controlled by means of a thermo-couple;

Figure 28 is a sectional plan view similar to Figures 6 and 6–A, collectively, with portions broken away and illustrating a modified form of a typical portion of a kiln having two parallel conveyor sections or sets of tracks for corresponding kiln cars;

Figure 29 is a longitudinal vertical sectional view taken substantially along line 29—29 in Figure 28;

Figure 30 is an enlarged transverse vertical sectional view taken substantially along line 30—30 in Figure 28 with the upper portion of the double-track kiln broken away;

Figure 31 is an enlarged transverse vertical sectional view taken substantially along line 31—31 in Figure 28.

GENERAL SYNOPSIS OF THE INVENTION

The apparatus for carrying out the improved method of heat-treating articles is embodied in a tunnel-type kiln particularly devised for processing brick following the hacking operation and reference to brick will be made throughout the specification. However, the term "brick" is not to be considered as a limitation, but is used as representative of many types of articles capable of being subjected to the treatment of the present method or, at least, to certain stages of the treatment. The present invention resides particularly in a novel method of controlling the flow of air currents longitudinally of the tunnel while controlling the temperature of the currents as they move within different sections of the tunnel and, at times, controlling the amount of moisture in the air.

As heretofore stated, the heat-treating apparatus or kiln includes a plurality of co-extensive sections which, as best shown in Figure 1, include a drying section or zone A, a preheating section or zone B, a furnace section, tempering or baking section C, a fast-cooling section D, a slow-cooling or annealing section E, and an atmospheric or final cooling section F. An air lock or car transferring vestibule L is interposed between the drying and preheating sections A and B.

The brick or other ware to be processed may be conveyed longitudinally of and forwardly in the sections A through F by a belt or any other desired means and, in this instance, the brick or ware, indicated at W, is stacked, substantially as shown in Figures 8, 9 and 11, upon kiln cars, each of which is broadly designated at 10. Of course, the brick are so stacked as to provide adequate air circulatory spaces throughout each stack of brick W, as is customary. The cars 10, supporting stacks of brick W are fed into the ingress end of the drying section A which may be maintained at a temperature of from 70° F. to 100° F. The train of cars 10 is slowly advanced through the drying section A along tracks 11 at a predetermined rate of speed.

In each instance, the rearmost kiln car 10 pushes the cars thereahead so the beds 12 of the cars are disposed in juxtaposition to form a substantial air seal between the beds of adjacent cars and to substantially prevent air above the beds of the cars from passing into the area beneath the beds of the cars and vice versa.

Hot dry air is drawn from the slow-cooling section E by a suction means or blower unit 175 (Figures 1, 2, 3, 7–A and 12) and forced into the discharge end of the drying section A and a substantial portion of the heated air is also directed into substantially horizontal flues, channels or passageways 13, 13a extending longitudinally of the lower portions of the respective side walls 14, 14a of the drying section A. (Figures 6, 6–A, 7, 7–A, 10 and 11.) The air is drawn out of the drying section A adjacent its rear ingress or feed end by a suction means or blower unit 31 (Figures 1, 7 and 10) and, during the course of movement of the air longitudinally of the drying section, the air is caused to move in a serpentine or zig-zag path, from side wall to side wall of the drying section, by means of a series of blowers or cross-flow fans and adjacent baffles provided adjacent each of the side walls of the drying section. Each blower unit in the drying section is broadly designated at 15 and each baffle or column is designated at 16. The fans 15 and baffles 16 at one side wall are staggered relative to the fans and baffles at the other side wall. For obvious reasons the feed end of the kiln is termed as its rear end.

It should be noted that the stacks of ware or brick W on cars 10 pass in close proximity to the baffles 16 so that air circulating chambers are defined between adjacent baffles 16 at each side of the ware, which chambers are entirely open to the ware throughout its height so the air is caused to flow toward the entrance end of the tunnel, under pressure, against corresponding sides of the ware at each side of the chambers, and is successively forced across, and at substantially right angles to the longitudinal axis of the tunnel and through the ware from chamber to chamber due to the novel arrangement of the staggered baffles and fans.

Now, as the brick enter the ingress end of the drying section A, they are generally soaking wet or "green" and, in order to insure that the rate at which the brick are dried is controlled, it is apparent that the relative humidity of the air adjacent the ingress end of the drying section A must be substantially higher than it is at the discharge end of the drying section A. Accordingly, openings 20 are provided in the upper walls, platforms or tables 21, 21a of the respective hot air passageways 13, 13a adjacent the side walls 14, 14a. One of the openings 20 is provided adjacent each of said fans or blowers 15 with a manually movable damper 22 for individually controlling the size of each opening 20 so the corresponding fan directs hot dry air from the adjacent hot air passageway into the kiln, the amount of hot dry air being mixed with the air in the kiln being determined by the size of the opening adjacent the corresponding fan. It is apparent that the hot air decreases the moisture in the air circulated through the ware W.

Cars are advanced from the drying section A through the air lock L into the preheating section B. The discharge and ingress ends of the drying and preheating sections A and B are sealed by respective doors or other closure means 25, 26 (Figures 6–A, 6–B, 7–A and 7–B) which may be opened and closed manually and, since the air in the preheating section B is maintained at a substantially greater temperature and pressure than that in the discharge end of the drying section A, the door means 26 for the ingress end of the preheat section is closed when the door means 25 for the discharge end of the drying section is opened and vice versa. This insures that the gases in the preheating section B, which are necessarily under relatively high pressure as compared to the pressure in the drying section A will not flow into the drying section and thus contaminate the air in the drying section.

In other words, each successive car 10 is advanced from the drying section A onto mobile tracks 27 in the air lock L in the course of which it is moved away from the immediately succeeding car, the closure means or door 25 to the discharge end of the drying section A is then closed and the door or closure means 26 to the ingress end of the preheating section is then opened. Thereupon, the latter car is then moved into the preheating section B onto tracks 30 (Figures 6–B and 7–B) and between side walls 32, 32a and the door 26 to the preheating section B is then closed. A suction means, blower unit or fan unit 29S (Figures 1, 2, 3, 7–B and 14) is provided adjacent the ingress end of the preheating section B and draws air from the furnace section C longitudinally through the preheating section B. It might be stated here that the front portions of the side walls 32, 32a adjacent the discharge end of the preheating section B and the side walls 33, 33a of the furnace section are each provided with a series of closely spaced burners or heating units 35 and a series of baffles, which baffles are disposed progressively closer together from the ingress end of the furnace section to the discharge end thereof (Figures 6–C, 6–D, 7–C and 7–D). The burners 35 and the latter baffles 36, 37 are also staggered on the opposite side walls of the preheating and furnace sections B and C. It is to be noted that, in all instances, adjacent baffles at each side wall of the tunnel define a chamber therebetween, which is open to substantially the entire height of the stacked ware, for entrapping the air or gas and air between the walls and the ware so it moves longitudinally against the ware and then back across and through the ware into the opposite chamber between adjacent baffles.

Thus, the hot air is drawn from the furnace section C into the preheating section B by said last-named suction means 29S. Approximately the first two-thirds of the preheating section B is also provided with staggered fans 40 and baffles 41 similar to those provided adjacent the side walls of the drying section A to cause cross-flow of the air as it is drawn longitudinally of the preheating section B so the air moves generally in a serpentine path in the opposite direction from that in which the ware is moved. Thus, as the ware advances from the ingress end of the preheating section B, the air passing through the ware gradually increases to cause what is commonly known as "water smoking" without damaging the ware. In other words, the ware is gradually heated in the preheating section B from, say, 150° to 300° F. up to approximately 2020° F. to burn any existing moisture out of the ware by the time the ware approaches the furnace section C.

Although the furnace or tempering section C is provided with staggered baffles 37 on opposite side walls 33, 33a thereof, the use of auxiliary blowers to effect the cross-flow of air is not required at the furnace section since, as combustion develops in the furnace section, the expanding gases, in combination with the suction means 31 at the ingress end of the preheating section, cause the air to flow in a serpentine path longitudinally of the furnace section and the gradually diminishing distances between adjacent baffles as the ware progresses from the ingress end to the discharge end of the furnace section C, also gradually increases the temperature of air to which the ware is subjected because the volume of air being heated is reduced in successive chambers defined between adjacent baffles 37. It is well known that a small volume of air can be heated faster and to a greater degree than a relative large volume of air when subjected to a given amount of heat. This is essentially what I have accomplished by arranging the baffles 37 in the manner described. Of course, in most instances, the burners 35 would be of the type equipped with means to force outside air to flow therethrough, such as small individual blowers, to effect efficient flow of the air.

It is apparent that the burner units 35 may be of the type which burn natural gas or liquified petroleum gas and Figures 25 and 26 are illustrations of typical means for admitting compressed air into and through the burner units and for admitting controlled amounts of fuel thereto. The fuel and air control apparatus shown in Figures 25 and 26, is omitted from the rest of the drawings for purposes of clarity. The air in the furnace section is maintained at a baking temperature of, say, approximately 2020° F. and is of such length as to adequately bake the brick W so the components of each brick coalesce.

Now, it should be noted that the side walls of the drying section, pre-heating section and baking or furnace section are spaced substantially farther apart from each other than the width of the ware passing therebetween, while the inner edges of the corresponding baffles are disposed closely adjacent the path of movement of the ware so the ware itself, to a substantial extent, assists in the deflection of the air currents at the baffles so as to effect the desired serpentine or cross-flow of air. As each succeeding car passes from the furnace section C into the rapid or fast cooling section D, the ware thereon passes between a pair of heat-absorbing or cooling panels 45, 45a (Figures 6–D, 6–E, 7–D, 7–E and 18), the latter panels being disposed immediately adjacent the path of travel of the ware on the cars and extending throughout a substantial portion of the fast cooling zone or section D. The fast cooling section D also includes side walls 46, 46a which are spaced a substantially greater distance apart than the width of the ware on the cars. The heat-conducting panels 45, 45a and corresponding portions of the side walls 46, 46a define respective pairs of air cells 50, 51 and 50a, 51a therebetween. The first air cells 50, 50a are relatively smaller than the second air cells 51, 51a and may be termed as dead-air cells. The air cells 51, 51a may be termed as live-air cooling cells.

The air cells 50, 51 and 50a, 51a are separated by respective partitions 52, 52a and the live-air cells 51, 51a are provided with respective vertically staggered baffles 53, 54 and 53a and 54a therein. Although only two such baffles are shown in the live air cells 51, 51a, a greater number of such baffles may be provided, if desired. The front ends of the cells, 51, 51a are partially closed by respective wall members 55, 55a (Figures 6–E, 7–E and 20) which define air ingress openings 56, 56a for permitting relatively cool air to flow from each of the cells 51, 51a into the forward portion of the fast cooling zone D where it is circulated in a generally circular or rotary path by a pair of blower units or fan units 60, 60a mounted in the respective side walls 46, 46a in staggered relationship. The blower units 60, 60a may be identical to the units 40 in the preheating section. Accordingly, a further description thereof will not be given. In order to assist in confining the air circulated by the latter blower units to the fast cooling section, a pair of substantially directly opposed baffles 61, 61a project inwardly from the respective walls 46, 46a to define the forward end of the fast cooling section D and the rear or ingress end of the slow cooling or annealing section E.

As will be more fully described hereinafter, means are provided for directing air at a carefully controlled temperature into the cells 51, 51a to cause rapid cooling of the ware passing through the fast cooling section. However, ceramic ware contains various types of bonding agents, such as silica and alumina, which become molten or at least semi-liquid during baking or burning of the ware in the furnace section C. Such agents can be cooled rapidly to a critical temperature of approximately 1063° F. If they are cooled rapidly below the critical temperature they contract relative to adjacent ceramic elements and may cause the ware to become excessively brittle or might even crack or rupture the ware. Therefore, to insure that the ware is not quenched below the critical temperature, the cooling air is maintained above this temperature in the fast cooling section B. As a safety precaution, the ware is generally not cooled rapidly below 1200° F. Thereafter, the ware is cooled at a relatively slow rate, this relatively slow cooling being commonly known as "annealing." Such slow cooling is effected in the annealing section E, where the ware is cooled slowly to a temperature of approximately 800° F. Below this temperature, it is unlikely that the ware would be damaged by rapid cooling.

The side walls of the annealing and final cooling sections E, F are merely extensions to the side walls 46, 46a of the fast cooling section D and, accordingly, the same reference characters shall apply thereto. The inner surfaces of the portions of the side walls 46, 46a defining the slow cooling section E and a rear portion of the final cooling section F are also provided with staggered baffles 64, 64a which cause a generally serpentine flow of the air therein and slots in the roof or ceiling of the slow cooling or annealing section E are provided with removable covers, to be later described, to accurately control the discharge of the hot air from the portion of the tunnel defining the slow cooling section E. The size or number of the said slots which are open in the ceiling of the annealing section E is carefully predetermined so as to maintain the temperature in the annealing or slow cooling section of the kiln substantially constant, but gradually diminishing from its rear portion to its front portion, so that the temperature of the brick, which was reduced to approximately 1200° F. in the fast cooling section D, is gradually reduced to a temperature of approximately 800° F. for example, in the slow cooling section E. Also, the flow of air is generally in the direction toward which the kiln cars move through the slow cooling and final cooling sections E, F rather than being in the opposite direction from the direction of movement of the kiln cars as is the case in the drying, preheating and furnace sections A, B, C of the kiln.

As each successive car passes into the final cooling section F, the ware or brick thereon passes between a pair of foraminated final cooling panels 65, 65a which are spaced closely adjacent the path of movement of the ware on the kiln cars and which are also spaced inwardly from the corresponding portions of the side walls 46, 46a to define cool air passage chambers 66, 66a between the cooling panels 65, 65a and the respective portions of the side walls 46, 46a. Means, to be later described, are provided for forcing air at "room" temperature into the chambers 66, 66a and, thus, through the perforated panels 65, 65a, which air is drawn through the ware and rearwardly into the front portion of the annealing area section E where it mixes with the air in the annealing section as it is drawn through the slots provided in the ceiling of the annealing section E.

In warm climates or during warm seasons, outside air only is forced into the chambers 66, 66a (Figure 6–F). However, in cold climates or during cold seasons of the year, the outside air is mixed with heated air from above the slow cooling section E, in a manner to be later described, so the brick are finally cooled to a temperature suitable to be handled by the attendants of the improved kiln. Preferably, the temperature introduced into the atmospheric cooling area F is maintained at a minimum of approximately 70° F.

The rear or discharge end wall of the kiln at the final cooling or atmospheric cooling section F is indicated at 70 in Figure 6–F and is provided with an egress or discharge opening 71 which may be closed by a suitable door means or doors 72. Of course, the door means 72 to the egress opening 71 is generally open only as each successive leading car 10 is moved, quickly, through the egress opening 71. This completes the description of the general construction of the improved kiln and its method of operation and the various sections of the kiln will now be described in detail.

Drying section

As heretofore stated, the drying section A of the kiln includes the side walls 14, 14a. All of the side walls of the kiln may be constructed in any desired manner and are preferably constructed from brick and are also preferably hollow walls provided with suitable insulation therein. However, since the construction of the side walls of the kiln may vary, a detailed description of the manner in which they are constructed need not be given. The drying section A is best shown in detail in Figure 6, 6–A, 7, 7–A, 10, 11 and 12 wherein it will be observed that the side walls 14, 14a rest upon a floor 80 preferably in the form of a concrete slab. The kiln car tracks 11 are also supported upon suitable cross-ties 81 embedded in the floor 80. The ingress or rear end of the drying section A is partially closed by a rear end wall 82 provided with an ingress opening 83 which may be closed and opened by a suitable door means or doors 84. The kiln car tracks 11 perferably extend from a point rearwardly of the ingress end of the drying section A so the door means 84 may be opened and the kiln cars fed, manually, one at a time, through the ingress opening 83.

As heretofore stated, each of the kiln cars 10 comprises a bed 12 (Figure 11). Each car bed 12 has spaced front and rear pairs of laterally spaced bearings 84, 85 depending therefrom in which opposite ends of respective front and rear axles 86, 87 are journaled (Figures 9 and 11). The front and rear axles 86, 87 have respective pairs of flanged wheels 90, 91 thereon which are adapted to ride upon the kiln car tracks 11. The bed 12 of each kiln car 10 is preferably made from metal and, accordingly, each bed 12 has a suitable refractory base 92 thereon for supporting the ware W and whose opposite sides are preferably spaced inwardly from opposite side edges of the corresponding bed 12.

In order to provide an air seal at the juncture of the beds of adjacent kiln cars 10 as they are propelled along the kiln, the front and rear edges of each bed 12 are provided with respective transverse mating or sealing members 93, 94, (Figure 9–A) the front sealing member 93 being in the form of an angle iron or substantially V-shaped member with its sharp edge extending forwardly and the rear sealing member 94 preferably being in the form of a channel bar so the V-shaped member 93 of each successive car fits between the flanges of the channel-shaped member 94 of a preceding car. The bed 12 of each kiln car 10 is also provided with a pair of longitudinally extending sealing strips 95, 95a which depend from opposite side edges of each bed 12 (Figure 11) and which are adapted to pass along mating said troughs or sealing troughs, to be later described, as each successive kiln car 10 passes through the preheating section B, the furnace section C and the cooling sections D, E and F.

It will be observed in Figures 4, 7, 9 and 11 that the side walls 14, 14a of the drying section A support a horizontal roof 100 whose lower surface is disposed on substantially the same level as the upper wall of the opening 83 in the rear wall 82, but the rear edge of the roof 100 is spaced forwardly of the rear wall 82 to define an off-set air discharge chamber or cupola 101 above the mean level of the tunnel and communicating with the interior of the tunnel. The rear portions of the side walls 14, 14a and the rear wall 82 project upwardly substantially above the level of the roof 100, and these wall portions, with a front wall member 102 and a roof member 103, form the cupola or air discharge member 101 at the rear or ingress end of the drying section A.

A duct 104 is connected to the front wall member 102 of the air discharge chamber 101 and is communicatively connected at its front end to the exhaust fan or suction means 31. The suction means 31 is shown in the form of a centrifugal type blower unit which is suitably supported upon the roof 100. Since there are many different types of blower units or suction devices which could be used to serve the purpose of the unit 31, a detailed illustration and description thereof is deemed unnecessary, it being deemed sufficient to state that the impeller of the blower unit 31 has a shaft 105 extending therefrom which is driven by means of an electric motor 106, pulleys 107, 108 and an endless belt 109. The motor 106 is suitably secured to a vertically disposed plate 110 projecting forwardly from the framework of the blower unit 31.

During operation of the improved apparatus, the blower unit 31 is driven constantly and draws air into the duct 104 and discharges the same upwardly, as indicated by arrows in Figure 7. In order to accurately determine the relative humidity of the air within the drying section A of the tunnel-type kiln, it is necessary to control the volume of air withdrawn from the drying section A and, therefore, a suitably manually controlled damper, generally designated at 115, is provided in the duct 104 leading from the air discharge chamber to the suction means or blower unit 31.

It is contemplated that the damper 115 in the duct 104 may be opened and closed by suitable means under the control of a suitable hygroscopic element positioned within and adjacent the ingress end of the drying section A.

As heretofore stated, the air channels 13, 13a include tables or platforms 21, 21a which as will be observed in Figure 11, are spaced slightly above the level of the beds 12 of the kiln cars 10. These air channels 13, 13a are also defined between the lower portions of the side walls 14, 14a and auxiliary channel-forming side walls 120, 120a. The distance between the auxiliary channel-forming side walls 120, 120a is slightly greater than the width of the beds 12 of the kiln cars 10 and the tables or raised platforms 21, 21a which form the top walls of the air channels 13, 13a, project inwardly to form a slight overhang relative to the auxiliary side walls 120, 120a. These overhanging inner edges of the tables 21, 21a also assist in preventing flow of air vertically, in either direction, past the beds 12 of the kiln cars 10.

The kiln cars 10 may be pushed or otherwise propelled forwardly along the tracks 11 by any suitable means such as is disclosed in Figures 27, 27-A, 28 and 29 of U.S. Patent No. 2,710,696 granted to R. A. Fontaine et al. on June 14, 1955. The propelling means for the kiln cars, in this instance, comprises a wheeled dolly 122 which is movable along a pair of relatively narrow-gauge dolly tracks 123 (Figures 6, 7, 8, 9 and 10). The front end of the dolly 122 has a piston rod 124 attached thereto. The front end of the piston rod 124 is attached to a piston 125 which is axially movable in a double-acting cylinder 126. The cylinder 126 is anchored in recesses 127 formed in the floor or base 80 of the drying section A, by means of brackets 130. The cylinder 126 has pipes or conduits 131, 132 connected to opposite ends thereof for alternately directing fluid pressure into corresponding ends of the cylinder 126. The fluid pressure may be controlled by any suitable or conventional means in order to determine the speed at which each successive car is propelled forwardly along the tracks 11.

The fluid pressure and electrical circuits for controlling operation of the dolly 122 are not shown in the present drawings, since they may be substantially the same as the fluid pressure and the electrical circuits disclosed for controlling operation of a kiln-car-transferring dolly 225 at the ingress end of the preheating section B (Figures 6-B, 7-B, 23 and 24). Accordingly, a detailed illustration and description of the fluid pressure and electrical circuits for the dolly 122 is deemed unnecessary.

The dolly 122 is also provided with a pivoted latch 135 which is normally biased upwardly, as shown in Figures 7 and 9, against a stop member 137 carried by the frame of the dolly 122. The latch 135 may be biased upwardly by means of a torsion spring, not shown, which may be arranged in substantially the same manner as the torsion spring 230 in Figure 24. With each forward stroke of the piston rod 124 and the dolly 122, the front edge of the latch 135 engages the rear axle 87 of a corresponding kiln car 10, or it may engage a skirt 260 depending from the front end of the next succeeding kiln car 10, to thus repel the kiln car along the track 11. Of course, any preceding kiln cars will be advanced by the cars immediately rearwardly thereof in the manner heretofore described.

Upon each rearward stroke of the dolly 122, the latch 135 successively engages the front and rear axles 85, 87 of the next succeeding kiln car and is biased downwardly so that it passes beneath these axles, after which it is forced upwardly by the torsion spring 137 preparatory to a repeat operation. Of course, it is apparent that the stroke of the piston rod 124 and dolly 122 is necessarily sufficient to insure that there is sufficient space rearwardly of a previously advanced car for positioning a succeeding car in the drying section A, adjacent the ingress opening 83.

It has already been described how the cross-flow fans or blower units 15 and baffles 16 cause a generally serpentine flow of air longitudinally of the drying section A and generally in the opposite direction from that in which the cars 10 are moved. Depending upon the character of the brick, insofar as moisture is concerned, it may happen that the desired relative humidity within the drying section A may be maintained merely by properly adjusting the damper 115 for the air discharge chamber 101. However, it is usually necessary to admit some hot dry air from the hot air channels 13, 13a into the drying section of the tunnel kiln in order to prevent the air flowing through the ware W from becoming saturated, and to progressively reduce the relative humidity in the air as the ware W moves forwardly from the ingress end to the egress end of the drying section A. Thus, the openings 20 and dampers 22 heretofore described are provided in the tables or platforms 21, 21a which form the top walls of the hot air channels 13, 13a.

The dampers 22 are shown, in this instance, in the form of plates which rest upon the corresponding platforms 21, 21a and each of which has an upwardly projecting handle or rod 140 thereon which may be seized by an attendant for opening and closing corresponding openings 20, as desired. In order to permit access to the handles 140 of the damper plates 22, it will be observed in Figures 6, 6-A, 7, 7-A, 8, 9 and 11 that the side walls 14, 14a are each provided with access openings 141 therethrough, there being one of the openings 141 provided adjacent each of the cross-flow fans 15. These openings 141 are preferably of sufficient size to permit an attendant to thrust his arm therethrough for manipulating the damper 22. Each opening 141 is closed by a suitable closure means or door 142, whenever the corresponding opening 141 is not in use.

The cross-flow fans or blower units 15 may be of any desired construction and, in this instance, each cross-flow fan comprises a propeller 145, preferably of the type used on light aircraft. The propeller 145 is fixed on a shaft 146 journaled in an elongated bearing unit 147 whose housing is fixed to a plate 150 provided with flanges 151 thereon which fit in a corresponding opening 152 provided in the side walls 14, 14a. The outer end of each shaft 146 has a pulley 153 fixed thereon which is engaged by an endless belt 154 which also engages a pulley 155 fixed on the shaft of an electric motor 156. Each electric motor is supported on a suitable bracket 157 projecting outwardly from the corresponding plate 150. The plates 150 may be secured to the side walls 14, 14a in any desired manner. The propellers 150 are preferably substantially on the same planes longitudinally of the kiln as the inner surfaces of adjacent baffles 16.

As heretofore stated, the open front or discharge end of the drying section A of the tunnel kiln is normally closed by door means 25 and, in order to introduce hot dry air from the annealing or slow cooling section E into the front end of the drying section A and to direct the air rearwardly, it will be observed in Figures 6-A, 7-A and 12 that, as each successive kiln car 10 approaches the discharge opening 25a of the drying section A, the ware W on a corresponding kiln car 10 passes between a pair of foraminated heating panels 160, 160a whose proximal surfaces are disposed closely adjacent the path of movement of the ware W and the corresponding kiln car 10 and are preferably disposed in the same longitudinal planes as the proximal surfaces of adjacent baffles. The baffles 16, incidentally, extend from the corresponding platforms or tables 21, 21a up to the ceiling or roof 100 and their proximal surfaces are preferably substantially on the same vertical planes as the proximal edges of the platforms 21, 21a of the hot air channels 13, 13a. The lower portions of the heating panels 160, 160a are preferably flush with the auxiliary wall members 120, 120a.

Since the foraminated heating panels 160, 160a are spaced inwardly from the respective side walls 14, 14a, they define therebetween respective hot air distributing chambers 161, 161a whose lower portions communicate with the open front ends of the hot air channels 13, 13a. The openings in the foraminated heating panels 160, 160a are preferably defined by horizontally arranged, fixed louvers 162, 162a. Since the heating panels 160, 160a would ordinarily be made from brick, each louver 162, 162a would normally be made from a single brick with the louvers 162, 162a extending inwardly and rearwardly at an angle from the respective hot air distributing chambers 161, 161a so as to tend to cause the hot air directed into the chambers to flow rearwardly relative to the direction of movement of the kiln cars. Of course, the direction of flow of the air currents through the drying section A is also induced by the blower unit 31 (Figure 7).

The upper edges of the vertically disposed foraminated heating panels 160, 160a are disposed on substantially the same level as the side walls 14, 14a or, at least, on substantially the same level as the lower surface of the roof 100 (Figure 7-A). However, the front end of the roof 100 terminates adjacent the rear ends of the heating panels 160, 160a and rests upon relatively narrow upright rear end panels 163, 163a (Figure 6-A) which serve as rear walls for the respective hot air distributing chambers 161, 161a. A discharge or egress opening 25a, closable by door means 25 of the drying section A, is formed in a front end wall 164 of the drying section.

It will be observed in Figures 1, 2, 5, 7-A and 12 that the front portions of the side walls 14, 14a also project upwardly above the main level of the side walls and above the level of the roof 100, as does the front wall 164 of the drying section A of the tunnel-type kiln to form a second cupola or a hot air introducing chamber broadly designated at 165. The upwardly extending forward portions of the side walls 14, 14a are spanned by a rear wall member 166 and the upper edges of these side wall portions and the front and rear wall members 164, 166 are closed by a suitable roof 167 (Figures 7-A and 12). The discharge opening 25a of the drying section A is of substantially the same width as the distance between the heating panels 160, 160a and, thus, the front wall 164 also serves to close the front ends of the chambers 161, 161a.

The upper ends of the distributing chambers 161, 161a are open and, thus, communicate with the hot air introducing chamber 165 thereabove. However, the space between the upper ends of the heating panels 160, 160a is partially closed by a ceiling member 170 which is provided with a plurality of spaced slots 171 therein (Figure 7-A). Here again, it is preferable that the walls of the openings 171 are inclined downwardly and rearwardly at an angle to also assist in directing air downwardly and rearwardly as it enters that zone of the drying section A through which the ware passes.

In order to introduce hot air from the upper portion of the slow cooling section E into the hot air introducing chamber 165 of the drying section A, one end of a pipe or conduit 173, which pipe or conduit 173 is preferably covered with a suitable insulation material, is connected to and communicates with a damper housing 174 carried by a blower unit 175. The damper housing 174 also communicates with the interior of the blower unit 175, which is shown in Figure 7-A in the form of a centrifugal fan or blower unit suitably supported upon a roof panel 176 of the air lock L. The damper housing 174 contains a manually movable free sliding gate, damper or plate 177 (Figure 7-A) which may be partially or fully closed, as desired, for controlling the amount of heated air directed into the hot air introducing chamber 165. Of course, the housing of the blower unit 175 communicates with an opening 180 formed in the upper portion of the front wall 164 of the drying section A.

The front end of the conduit 173 is connected to a hot air collecting chamber 325 of the slow cooling section E in a manner to be later described. It is evident, therefore, that the blower unit 175 also serves as a suction means for drawing hot air from the slow cooling section E and introducing the same into the drying section A.

The blower unit 175 may be of any desired or conventional construction and, accordingly, a detailed description and illustration is deemed unnecessary. However, the usual impeller of the blower unit 175 is driven by means of a shaft 181 journaled in bearings 182 carried by a bracket 183. The bracket 183 is suitably secured to and supported by the roof 176 of the air lock L and supports a suitable electric motor 185 on whose shaft a pulley 186 is secured. A pulley 187 is also mounted on the shaft 181 (Figure 12) and the pulleys 187, 186 are engaged by an endless belt 190. The electric motors 106, 185 may operate continuously and, accordingly, a detailed description of the electrical circuits therefore is deemed unnecessary.

It is thus seen that means are provided for introducing hot air into the drying section A, during the movement of the ware therethrough, during which air is withdrawn from the rear portion of the drying section A by the blower unit or suction means 31 with damper means provided both at the inlet and outlet ends of the drying section A for accurately controlling the amount of air and rate of flow of the air rearwardly through the drying section in a generally serpentine path. Also, since a substantial percentage of the hot dry air introduced into the hot air introducing chamber 165 is metered or directed into the hot air channels 13, 13a, it is apparent that a reserve supply of hot dry air is available at all times throughout the length of the drying section so the dampers 22 adjacent the corresponding cross-flow fans 15 may be opened or closed to permit the hot dry air to mix with the humid air, which is humidified by the green brick, so as to accurately control the rate at which the brick is dehumidified or dried to correspond relative to the rate at which the brick or ware W passes through the drying section A and to correspond with the overall length of the drying section A. Ordinarily, the temperature of the air at the ingress end of the drying section A may vary from 70° to 100° F. and the temperature adjacent the discharge or front end of the drying section A may vary from 150° to 300° F., although it is preferred that the temperature of the air at the discharge end of the drying section A is approximately 300° F. for the processing of brick and similar articles.

It will be observed in Figures 6–A and 7–A that the side walls 14, 14a are each provided with at least one access opening 192 therein, which openings may be positioned as desired in the walls 14, 14a so an attendant or attendants may gain access to the interior of the drying section A in the event of the ware becoming disarranged during the course of its movement longitudinally in the drying section A. The openings 192 are shown as such in Figures 6–A and 7–A, however, these openings 192 are normally closed by any suitable means such as by loosely stacking brick in these openings. The side walls 32, 32a at the preheating section, adjacent the cross-flow fans 40, and the side walls 46, 46a at the fast-cooling and annealing sections D, E, are also provided with access openings similar to the openings 192 as will be later described.

In order to substantially prevent air from passing beneath the door means 25 (Figures 6–A, 7–A and 12) between the lower portions of the heating panels 160, 160a and between the tracks 11, it will be noted that the floor 80 extends forwardly a relatively short distance beyond the door means 25 and is provided with a transverse projection or threshold 80a which projects upwardly from the floor 80 and is of substantially the same height above the floor 80 as the upper surfaces of the kiln car tracks 11. The forward ends of the kiln car tracks also terminate a slight distance forwardly of the door means 25. A similar threshold 83a is provided for the door means 84 at the rear end of the drying section A (Figures 7 and 9).

*Air lock and kiln car transferring means*

As heretofore stated, the air lock L, which may also be termed as a vestibule, is provided to prevent hot air of relatively high pressure within the preheating section B, from flowing into the drying section A in the course of transfer of kiln cars 10 from the drying section A into the preheating section B— so the gases and products of combustion in the preheating section will not pass into the drying section and thereby contaminate the air in the drying section.

The rearmost or ingress end of the preheating section B is provided with a rear wall 200 (Figures 6–B, 7–B and 13) having an ingress opening 201 therein which is normally closed by the door means 26 heretofore described. The lower portion of the rear wall 200 of the preheating section B as well as the lower portion of the front wall 164 of the drying section A (Figures 12 and 13) are each relatively wide or, in other words, project outwardly beyond the respective side walls 32, 32a and 14, 14a of the drying and preheating sections A, B to serve as the respective front and rear walls of the air lock or vestibule L.

The air lock is also provided with a side wall 202 and its other side between the lower portions of the walls 164, 200 is provided with suitable door means 203 which may be open and closed for purposes to be later described. The roof member 176 spans the distance between the walls 164, 200, 202 and the door means 203 and the air lock L is provided with a sunken or recessed floor 204 whose upper surface is on a substantially lower level than the upper surface of the floor 80 and, of course, the preheating section B is also provided with a floor 205 which may be similar to the floor 80.

The floor 205 is preferably on a somewhat lower level than the floor 80 of the drying section A in order that cross-ties 206, upon which the kiln car tracks 30 are supported, are exposed and rest upon the floor 205 rather than being imbedded therein as are the cross-ties 81 relative to the floor 80. The rear portion of the floor 205 of the preheating section 205 is also preferably provided with a suitable transverse threshold 207 beneath the door means 206 whose upper surface is on substantially the same level as the upper surfaces of the tracks 30.

The sunken floor 204 of the air lock L is provided with a pair of parallel transversely extending tracks 210 thereon which extend outwardly through a threshold 211 provided on the floor 204 beneath the door means 203. A manually movable transfer car or platform 212 is provided with flanged wheels 213 which ride upon the tracks 210 and the platform 212 has a pair of kiln car or wide gauge tracks 27 fixed thereon which are adapted to be alined with the kiln car tracks 11, 30 of the drying section A and preheating section B. A suitable stop member 215 is provided for limiting movement of the laterally movable transfer car 212 to insure that the tracks 27 thereon are properly alined with the tracks 11, 30 when the transfer car 212 is properly positioned within the vestibule or air lock L.

As each successive kiln car 10 reaches a position immediately rearwardly of the door means 25, the door means 25 is opened manually, or by any other suitable means, and the leading car 10 in the drying section A— is transferred into the vestibule or air lock L. Thereafter, the door means 25 is closed and the door means 26 is opened and, normally, the kiln car 10 then positioned upon the tracks 27 of the platform or transfer car 212, is then advanced into the preheating section B. Of course, if it so happens that the ware on said leading kiln car 10 is not properly dried or has become damaged in any way during its course through the drying section A, the leading car, while positioned upon the tracks 27 of the transfer car 212 may be transferred laterally after the door means 25 has been closed, by opening the door means 203 and moving the transfer car 212 outwardly along the tracks 210. Thereafter, the kiln car 10 then on the transfer car 212 could be moved off the transfer car 212, whereupon the transfer car 212 would be returned to the position shown in Figures 6–A, 6–B and 13.

Now, in order to effect the transfer of each successive kiln car 10 from the drying section A into the preheating section B, a front portion of the floor 80 of the drying section has a relatively short pair of relatively narrow dolly tracks 220 thereon which extend through the threshold 80a (Figures 6–A and 7–A) and terminate on substantially the same lateral plane as the kiln car tracks 11. The platform or transfer car 212 is also provided with a pair of narrow gauge dolly tracks 221 which are normally alined with the short tracks 220 and extend across the transfer car 212 and are alined with another pair of relatively short dolly tracks 222 which extend through the threshold 207 (Figure 7–B) at the ingress end of the preheating section and are suitably secured to the floor 205 in the preheating section.

A wheeled dolly 225 (Figures 6–B and 7–B) somewhat similar to the dolly 122 (Figures 6 and 7) is supported for movement along the dolly tracks 220, 221, 222 and the frame of the transfer dolly 225 has spaced front and rear latches 226, 227 pivotally mounted thereon and projecting upwardly therefrom. The latches 226, 227 are normally biased to the raised position shown in Figure 7–B by any suitable means such as springs 230 (Figure 24) such movement being limited by means of stop members 231, 232 carried by the frame of the transfer dolly 225.

In order to permit freedom of movement of the dolly 225 and its latch member 226, 227 although the door means 25, 26 may occupy closed position, it will be observed in Figures 7–A, 7–B, 12 and 13 that the door means 225, 226 are each provided with a suitable opening 235 in the lower central portion thereof and being of a size to accommodate the transfer dolly 225 and the latches 226, 227 thereof. The front end of the dolly 225 has a piston rod 236 fixed thereto which extends into a double-acting cylinder 237 and has a piston 240 fixed thereon. The cylinder 237 is fixed in suitable brackets in the floor 205 by brackets 238 (Figure 7–B). Opposite ends of the cylinder 237 have fluid pressure conduits 241, 242 connected thereto which are interposed in a suitable fluid pressure circuit for alternately directing fluid under controlled pressure into opposite ends of the cylinder 237.

For example, it will be observed in Figure 23 that the ends of the conduits 241, 242 remote from the cylinder 237 are connected to opposite sides of a suitable manually operable or automatically operable four-way valve 245 to which corresponding ends of conduits 246, 247 are also connected. The conduit 247 extends to the output side of a suitable pressure pump 248 which communicates with a compression tank 250 by means of a pipe 251.

The conduit 246 extends to the input side of the compression tank 250. The conduit 247 has a suitable regulator valve 252 interposed therein. It is thus seen that the amount of pressure of the fluid and the rate of flow thereof may be controlled as it enters the four-way valve 245 and, of course, the four-way valve 245 may be manipulated to cause the flow of fluid under pressure into either end of the cylinder 237 while withdrawing the fluid pressure from the other end thereof. When the four way valve 245 is positioned as shown in Figure 23, it is apparent that this causes the transfer dolly 225 to move forwardly and, accordingly, the pressure regulator valve 252 is so adjusted at this time as to cause the fluid to enter the rear or left-hand end of the cylinder 237 at a relatively slow rate so the corresponding kiln cars and preceding cars are moved forwardly through the preheating section B and subsequent sections at predetermined relatively slow speed. On the other hand, when the valve 245 is rotated approximately 90° from the position shown in Figure 3, the transfer dolly 225 is caused to move rearwardly or from right to left in Figures 6–B, 7–B and 23. At this time, the regulator valve 252 is so adjusted as to permit fluid to enter the right-hand end or front end of the cylinder 237 at a relatively fast rate and to thereby cause the transfer dolly 225 to move relatively fast from right to left or rearwardly in Figures 6–B, 7–B and 23.

The pump 248 is driven by an electric motor 253 (Figure 23) to opposite sides of which conductors $a$, $b$ are connected. The other end of conductor $a$ is connected to one side of a plug $c$ adapted to be connected to a suitable source of electrical energy, not shown, and the other side of the plug $c$ has a conductor $d$ connected thereto. Proximal ends of the conductors $b$, $d$ are connected to opposite sides of a normally closed switch $e$ connected to a spring-loaded plunger $f$ which projects upwardly above and adjacent one of the dolly tracks 222 and is adapted to be engaged and move downwardly by one of the wheels of the dolly 225 when it reaches the end of its forward stroke to thereby open the switch $e$ and break the circuit to the electric motor 253. A normally open switch $g$ is also operatively connected to the plunger $f$ and when the plunger $f$ is moved downwardly in the manner heretofore described, the switch $g$ establishes contact between conductors $h$ and $j$. The end of conductor $h$ remote from switch $g$ is connected to a medial portion of conductor A and the end of conductor $j$ remote from switch $g$ is connected to one side of a warning device such as an electric bell $k$. The other side of the electric warning device or bell $k$ has a conductor $m$ leading therefrom to a medial portion of conductor $d$.

It is thus seen that, at the end of each active or forward stroke of the dolly 225, further flow of fluid pressure from the hydraulic pump 248 to the rear end of the cylinder 237 is prevented, since the motor 253 is stopped and, also, the warning signal $k$ is energized to thereby warn the attendant that the preheating section is conditioned for reception of another kiln car from the vestibule or air lock L.

In order to effect initiation of a return or rearward stroke of the dolly 225, the conductors $d$, $b$ have opposite ends of a conductor $n$ connected thereto in which a manually operable switch $p$ is interposed. The switch $p$ normally occupies open position and is closed momentarily to initiate rearward movement of the dolly 225, whereupon it is apparent that the switch $p$ may be opened. The dolly 122 at the ingress end of the drying section A may also be operated and controlled in substantially the same manner as that thus far described for the dolly 225.

*Method of operation of transfer dolly 225*

It will be observed in Figures 9, 9–A and 14 that the front end of the bed 12 of each kiln car 10 has a member or skirt 260 depending therefrom, which may be formed from sheet metal, and whose lower edge terminates on substantially the same level as the axles 86, 87, of each kiln car 10. Since the rear latch 227 of the transfer dolly 225 terminates on a lower level than the front latch 226 when these two latches are in their normal, relaxed position, the rear latch 227 will only engage either of the axles 86, 87 or the skirt 260 of each successive car during the course of forward movement thereof, whereas the front latch 226 can also engage either the skirt 260 or the rear sealing member or channel bar 94 in the course of each forward movement thereof. This will be more clearly described hereinafter.

The rate at which the kiln cars 10 are moved forwardly in the drying section A should be such that the front edge of a leading car 10 in the drying section A will be disposed immediately adjacent and rearwardly of the door means 25 at substantially the time that the transfer dolly 225 occupies the position shown in Figure 7–B and, at this time, the latch 226 will be in engagement with the rear end of a preceding kiln car 10. Thus, when an attendant observes the front end of a kiln car in the drying section as being immediately rearwardly of the door means 25, a rearward stroke is imparted to the transfer dolly 225 by means of the circuit shown in Figure 23, whereupon the latches 226, 227 are biased downwardly as they pass beneath any obstructions in their path until the rear latch 227 occupies a position rearwardly of the skirt 260 of the then leading kiln car 10 in the drying section A, this being the limit of the rearward or inactive stroke of the piston rod 236 and the transfer dolly 225.

A forward stroke is then imparted to the transfer dolly 225 preferably at a relatively fast rate of speed as compared to the speed at which the kiln cars are normally propelled through the preheating section B and subsequent sections of the kiln, so the dolly 225 again returns to the position shown in Figure 7–B, thereby positioning a kiln car 10 upon the tracks 27 of the lateral transfer car 212. The door means 25 is then closed and the door means 26 is opened, whereupon another cycle in the movement of the transfer dolly 225 is effected. Of course, a car 10 will not have reached a position closely adjacent the door means 25, within the drying section A by this time so the front latch 226 will pass beneath the skirt 260 on the kiln car 10 then positioned on the transfer car 212 and will then engage said skirt and impart forward movement to the car positioned on the transfer car 212 to thereby move the transfer car through the opening 201 at the ingress end of the preheating section B and onto the tracks 30.

Another rearward stroke is then imparted to the piston rod 236 and the transfer dolly 225 so the front latch 226 moves rearwardly of the rear end of the kiln car 10 thereabove and engages the rear end of the bed of said car, whereupon the door means 26 may be closed and the trailing kiln car 10 then in the rear portion of the preheating section B is then slowly advanced forwardly along the tracks 30 and, in turn, advances any preceding car or cars therewith. Of course, during the latter rearward stroke of the transfer dolly 225, here again, the skirt 260 or front end of a succeeding car 10 will not have moved forwardly in the drying section A sufficiently to be engaged by the rear latch 227.

It is thus seen that the transfer dolly 225 will transfer a leading car from the preheating section into the vestibule or air lock L while the door means 25 is opened and while the door means 26 is closed whereby the car then in the vestibule may remain at rest while the door means 25 is closed and the door means 26 is open. Of course, since the latch 226 on the dolly 225 will have previously advanced the previous trailing car in the preheating section B to where there is ample room rearwardly thereof for positioning another car within the preheating section B it is apparent that the car last transferred from the drying section A into the vestibule L may be readily transferred therefrom into the ingress portion of the preheating section B, whereupon the door means 26 may then be closed to complete a cycle in the operation of the transfer dolly 225. The operation of the dolly 225 during the transfer of a car from the front end of the drying section A into the rear end of the preheating section B is preferably manually controlled by manipulating the valves 245, 252 in Figure 23. However, it is contemplated that the sequence of steps in the operation of the transfer dolly 225 may be effected automatically by anyone skilled in the art without departing from the spirit of the invention.

*Preheating section*

The preheating section B is best illustrated in Figures 6–B, 6–C, 7–B, 7–C, 14 and 15. The side walls 32, 32a of the preheating section B extend upwardly from the floor 205 and the lower portions of the side walls 32, 32a are provided with respective inwardly projecting portions 265, 265a which are similar in cross-sectional configuration to the hot air channels 15, 15a of the drying section A (see Figures 11 and 14). However, the projections 265, 265a are preferably solid, since they do not serve as air ducts.

The projections 265, 265a form respective tables or platforms 267, 267a whose upper surfaces are spaced substantially above the floor 205 to conform with the upper surfaces of the platforms 21, 21a of the drying section A. The proximal or inner surfaces of the projections 265, 265a (Figure 14) are recessed in a stepped manner, as at 270, 270a so the platforms 267, 267a overly the outer edges of the lower portion of the refractory base 92 of each kiln car 10 as it is moved along the tracks 30. Also, the recesses 270, 270a are formed at their lower portions wtih sealing troughs 271, 271a which may also be termed as sand troughs since they are adapted to contain sand or other loose fine aggregate through which the downwardly projecting sealing strips 95, 95a of each successive kiln car 10 pass as the cars 10 are propelled along the tracks 30 in the preheating section B.

It should be noted that the projections 265, 265a with the platforms 267, 267a, the recesses 270, 270a and sand troughs 271, 271a are co-extensive in that they not only extend throughout the length of the preheating section B, but also extend substantially throughout the length of the furnace section C, the fast cooling section D, the slow cooling or annealing section E and the final cooling section F. The sand troughs 271, 271a would ordinarily be filled with sand or other fine aggregate at the time that the kiln is constructed. However, the sealing strips 95, 95a on the kiln cars 10 tend to move small amounts of the aggregate in the troughs 271, 271a along therewith as they are advanced through the sections B, C, E and F of the kiln. Accordingly, means are provided adjacent the ingress end of the preheating section B for replenishing the supply of sand in the troughs 271, 271a as best shown in Figures 6–B and 14.

To this end, the lower ends of pipes or conduits 273, 273a communicate with the troughs 271, 271a adjacent their rear ends and extend upwardly and outwardly at an angle through the respective projections 265, 265a and side walls 32, 32a where they communicate with open top containers or funnels 274, 274a, respectively. The funnels 274, 274a are merely filled with sand or other fine aggregate and, as the sand tends to move away from the open lower ends of the conduits 273, 273a in the troughs 271, 271a, the sand is replaced as it flows from the funnels 274, 274a downwardly, by gravity, along the conduits 273, 273a. The use of troughs and sand replenishing means as above described to provide an air seal at opposite side edges of the bed of each successive kiln car is well known in the art and is not considered peculiar to the present invention.

As each successive kiln car 10 is moved into the ingress end of the preheating section B, the ware W thereon initially passes between a pair of foraminated side panels 280, 280a which are disposed closely adjacent the path of movement of the ware W and are supported on the proximal portions of the platforms 267, 267a, respectively, the ware W also passes beneath a false ceiling or roof 281 which is also foraminated and is supported upon the upper edges of the foraminated side panels 280, 280a. The lower surface of the foraminated false ceiling 281 is disposed on substantially the same level as the lower surfaces of the roofs 100, 176 of the drying section A and the air lock L. The side panels 280, 280a are preferably of substantially the same length as a kiln car 10. The side panels 280, 280a serve as the inner walls of air dispersing side chambers 282, 282a, since the foraminated side panels 280, 280a are spaced inwardly from the respective side walls 32, 32a.

It will be observed in Figure 6–B that the front end of chamber 282a is closed by the first of the staggered baffles 41 while the front end of the chamber 282 is closed by a wall member 283. Of course, the wall member 283 and the staggered baffles 41 also rest upon the corresponding tables or platforms 267, 267a. The rear portions of the side walls 32, 32a are provided with respective upwardly extending portions 32b, 32c. The side wall portion 32c terminates on a level substantially higher than the wall portion 32b (Figure 14) and serves as one side of another cupola forming a suction chamber or air exhaust chamber 285 for the preheating section B. The front end of the air suction chamber 285 is closed by a substantially L-shaped wall member 286 and the rear end of the air suction chamber 285 is closed by the upper portion of the rear end wall 200 of the preheating section B. Of course, the upper portion of the wall 200 is necessarily shaped substantially the same as the L-shaped front wall member 286 in order to accommodate the suction pipe or conduit 173 extending from the slow cooling section E to the drying section A.

Because of the conduit 173, an intermediate forwardly and rearwardly extending upright wall member 287 is spaced inwardly from the upper portion 32b of the righthand side wall 32 of the preheating section B and has a relatively narrow roof panel 290 extending outwardly from adjacent the lower edge thereof to the upper end of the portion 32b of the side wall 32. The upper end of the intermediate wall member 287 preferably terminates on substantially the same level as the upper end of the portion 32c of the side wall 32a and another roof member 291 closes the area between the uppermost portions of the portion 32c of side wall 32a, the intermediate wall member 287, the front wall member 286 and the upper portion of the rear wall 200 to complete the construction of the air suction chamber 285.

The lower edge of the wall member 287 and the narrow roof member 290 are spaced substantially above the foraminated false ceiling 281 so the air suction chamber 285 communicates with the side chambers 282, 282a defined between the foraminated wall members 280, 280a and the respective outside walls 32, 32a. The upwardly projecting portion of the front wall member 286 of the suction chamber 285 is provided with an opening 293 therein in which a duct 294 of a suitable suction or exhaust fan generally designated at 295 is positioned. The preheating section, per se, is provided with a roof 296 on which the suction means 295 is supported.

The suction means or exhaust fan 295 may be identical to the exhaust fan or suction means 31 at the rear end of the drying section A, and, accordingly, a further description thereof is deemed unnecessary. The duct 294 is also provided with a manually operable damper assembly 297 therein for controlling the rate at which air is exhausted from the chambers 285, 282, 282a and, accordingly, from the rear or ingress end of the preheating section B.

The roof 286 of the preheating section B may be of any desired shaped and construction, but is preferably curved or arcuate in cross-section, as shown in Figure 15, with the lower surface of its apex preferably being on substantially the same level as the lower surfaces of the roofs 100, 176 of the drying section A and the vestibule L. As best shown in Figure 15, it will be observed that the baffles 41 extend from the platforms 267, 267a upwardly and terminate adjacent to or in engagement with the lower surface of the roof 296 of the preheating section B.

As heretofore stated, one of the cross-flow fans or blower units 40 is disposed forwardly of and immediately adjacent each of the vertical baffles 41, since the hot air in the rear portion of the preheating section, say, the first one-third of the preheating section, is obtained from the furnace section and from the front portion of the preheating section B. The fans or cross-flow blowers and adjacent baffles 41 are provided only in approximately the first one-third of the length of the pre-heating section; forwardly from its rearmost or ingress end and subsequent to the foraminated side panels 280, 280a whose openings therein communicate with the side chambers 282, 282a. The length of each section of the kiln may vary according to the type of material processed therein and, of course, the number of cross-flow fans in the drying and preheating sections A, B may also vary accordingly.

The cross-flow fans or blower units 40 in the preheating section B are quite similar to the cross-flow fans or blower units 15 in the drying section A with the exception that, because of the relatively high temperature of the air within the preheating section B, the elongated or bearing units therefor are shielded from the interior of the preheating section B. Thus, each of the cross-flow blower units 40 comprises a propeller 300 which, as best shown in Figure 15, is fixed on a shaft 301 journaled in a bearing unit 302 whose inner end is fixed to a shield member 303. The shield member 303 is penetrated by the shaft 301 on which the propeller is secured.

The shield 303 flares outwardly and is fixed to a substantially rectangular frame 304 which is secured in a suitable opening provided therefor in the corresponding side wall of the preheating section B. The outer end of the bearing housing or unit 302 preferably terminates substantially flush with the outer surface of the corresponding side wall of the preheating section B and the outer end of the shaft 301 is driven by means of pulleys 305, 306 fixed on the shaft 301 and the shaft of a motor 307, respectively, which pulleys are connected by an endless belt 310. The electric motor 307 generally operates continuously and an illustration and description of an electrical circuit therefor is deemed unnecessary. The motor 307 is supported on a suitable bracket 311 carried by the frame 304 and projecting outwardly therefrom.

The side walls 32, 32a of the preheating section B, forwardly of the chambers 285, 282, 282a, are preferably provided with spaced access openings 313 which may be closed during normal operation of the kiln by any suitable means, such as loosely stacked brick or the like indicated at 314 in Figure 15. Also, it is preferable that the brick or other means 314 used for temporarily closing the access openings 313 are so arranged as to provide "peep" holes 315 therein so an attendant may view the ware W on the successive kiln cars 10 in its course through the preheating section B.

The arrangement of the baffles 36, 37 and burner units 35 in the latter portion of the preheating section and throughout the length of the furnace section to cause a serpentine flow of air, as it is heated, toward the ingress end of the furnace section C has already been described and further description of the preheating and furnace sections B and C will be limited accordingly.

*Furnace section*

It is apparent by referring to Figure 1, for example, that the roof 296 for the preheating section also extends from one end to the other of the furnace section C. This roof 296 also extends over the fast cooling section D. In Figure 16–C it will be observed that the side walls 33, 33a of the furnace section C are substantially thicker than the side walls 32, 32a of the preheating section B to provide for arched openings 320 for the corresponding heating units or burner units 35. The portions of the side walls 32, 32a in which burner units 35 are disposed are also relatively thicker than the portions thereof having the cross-flow units 40 mounted therein to accommodate the arched openings 320 for the corresponding heating or burner units 35. The burner units 35 may be of any desired construction and it has been found that blower-type oil or gas burners serve satisfactorily for the purpose intended.

It will also be noted that the inner surfaces of the side walls 32, 32a of the furnace section (Figure 6–C) are preferably spaced further apart from each other than are the inner surfaces of the side walls 32, 32a of the preheating section B to insure that the air circulated by the burner units is properly heated and to assist in causing the serpentine flow of the air in the furnace section C. Of course, the baffles 36, 37 each extends from the corresponding platform 267, 267a upwardly to the roof 296.

Suitable thermo-couple instruments 319 are provided at strategically spaced points along the side walls 32, 32a and may extend through the corresponding walls for indicating whether the air within the corresponding portions of the preheating section is maintained at the desired temperature. It is also contemplated that the thermo-couple instruments 319 may be interposed in an electrical circuit for controlling operation of the damper 297 positioned in the exhaust fan conduit 294.

There are various ways in which the burner units 35 may be controlled to cause the air currents flowing from the forward end of the furnace section C, in a serpentine manner, to be maintained at a relatively high temperature adjacent the forward or front end of the furnace section and to gradually diminish in temperature as they progress toward and through the preheating section B. By way of example, it will be observed in Figures 25, 26 and 27 that the burner units 35 are shown in the form of gas burning units and are formed in groups wherein each group of burner units 35 is controlled independently of the others.

For example, in Figure 25, it will be observed that 14 of the burner units 35 are shown positioned in the wall 33 of the furnace section. It is apparent that a like number of burner units 35 is provided in the other wall 33a of the furnace section C (see Figures 6–C and 6–D). These burner units 35 in Figure 25 are formed into groups of six, five and three reading from left to right in Figure 25 and a group of five of the burner units 35 is also provided in the front portion of each of the side walls 32, 32a of the preheating section B. Common control means are provided for corresponding groups of burner units on opposite sides of the preheating and furnace sections, substantially as shown in Figure 26. Since each of the common pairs of groups may be controlled in an identical manner, only the control means for one of these common pairs of groups will be described and like parts associated with the other common pairs of groups will bear the same reference characters.

Referring more especially to Figure 26, it will be observed that each of the burner units 35 has a gas feeding pipe line 321 and an air-introducing or feeding pipe or conduit 322 communicatively connected thereto. The pipes 321 or conduits 321, 322 at one side of the kiln are connected to respective common manifold pipes or conduits 323, 324 while the ends of the conduits 321, 322, remote from the burner units 35 at the other side of the kiln are connected to respective common manifold conduits 323a, 324a. The manifold conduits 324, 324a are closed at opposite ends, since the branch conduits 322 leading therefrom are communicatively connected to the sides of the corresponding manifold conduits 324, 324a.

The manifold conduits 324, 324a for each pair of groups of burner units 35 are connected to opposite ends of a substantially U-shaped conduit A–2, to a medial portion of which the lower end of a branch pipe or conduit A–3 is communicatively connected. The branch pipe A–3 extends upwardly and then extends rearwardly and upwardly at an angle and is connected to a primary air conduit or pipe A–4 which extends longitudinally above the central portion of the furnace section and the central portion of the front end of the preheating section. The conduit A–4 is common to all of the branch conduits A–3 or all of the groups of burner units 35 and one end thereof is connected to a suitable blower means generally designated A–5. The blower unit or blower means may be suitably supported upon the roof 296 at the fast cooling section E. A primary gas or fuel conduit G–2 is positioned beneath and extends longitudinally of the horizontally disposed air conduit A–4 and these conduits A–4 and G–2 may be supported in any desired manner. Of course, the conduit G–2 has a branch pipe G–3 leading therefrom to a suitable source of fuel indicated schematically at G–4 in Figure 25.

It will be observed in Figure 26 that the manifold fuel conduits 323, 323a have the lower ends of respective conduits G–6, G–6a connected thereto whose upper ends are connected to respective air-gas ratio regulator valves G–7, G–7a. The valves G–7, G–7a have respective pairs of pipes or conduits G–10, A–6 and G–10a, A–6a connected thereto. The pipes or conduits G–10, G–10a extend inwardly toward each other and are connected to a common gas or fuel pressure regulator valve G–12 which is, in turn, communicatively connected to the main fuel supply line G–2. The pipes A–6, A–6a are commonly known as "pilot" air lines and their ends remote from the respective valves G–7, G–7a are connected to medial portions of the air conduit A–2.

The burner units 35 may be of conventional construction and the air-gas ratio and regulator valves may also be of the usual conventional type used for such burner units and, accordingly, a detailed description thereof is deemed unnecessary.

In order to control the heat output of each pair of groups of burner units 35, the vertical portion of each of the branch conduits or pipes A–3 has a suitable reversible electric motor A–10 suitably mounted thereon which is coupled, as by a belt A–11 and pulleys A–12, A–13 to a butterfly damper A–14 positioned within the vertical portion of each branch pipe or conduit A–3. Each of the electric motors is controlled in the usual manner as by means of a suitable control unit such as a thermocouple element A–15 which may be of the usual type. Thermo-couples are well known in the art and are generally composed of two dissimilar wires (Figure 27) joined together in a circuit which develops a small direct-current voltage proportional to the temperature at the juncture of the two wires whenever a temperature difference exists between said juncture and the setting of its control unit (such as E–1). The resultant electromotive force correspondingly excites the electrical control unit E–1. Any suitable type of bimetallic or other thermal-responsive device may be used, to actuate a corresponding electrical device, for the purpose intended. Therefore, a detailed illustration and description thereof is deemed unnecessary. It is apparent that one of the thermo-couple units A–15 would be disposed within the kiln between each of said pairs of groups of thermal units in order that it will control the position of the corresponding damper A–14 in response to variations in temperature within corresponding zones of the furnace and preheating sections. As a matter of fact, the intervening circuit between each electric motor A–10 and its thermocouple unit A–15 is also of the usual conventional type and since, the specific controls for the heating units or burner units 35 do not constitute parts of the present invention, only a general description thereof will be given.

In this instance, the thermo-couples A–15 are each shown in Figures 7–C, 7–D as being embedded in corresponding portions of the roof 296 and each thermocouple unit A–15 has a pair of conductors A–20, A–21 leading therefrom to a suitable electronic control mechanism E–1 which may be in the form of an electronic proportioning relay of conventional or other construction and which also has a pair of conductors A–22, A–23 connected thereto in which a suitable manually operable switch A–24 is interposed. The electronic relay has two sets of three conductors A–25 and A–26 leading therefrom which are alternately energized at predetermined intervals in response to temperature to which the corresponding thermo-couple unit A–15 is subjected and which, in turn, alternately impart movement to the damper A–14 in opposite directions to thereby control the amount and force of compressed air entering the furnace and preheating sections through the corresponding burner units 35.

Referring to Figures 6–C, 6–D, 7–C and 7–D, it will be observed that the front surfaces of the baffles 37 in the furnace section C slant inwardly and rearwardly toward the center of the preheating section to form beveled surfaces 37b thereon and, since the baffles 37 on the walls 33, 33a are staggered, the air heated by the burners 35 in the furnace section is not only caused to flow across the furnace section, but is also caused to move in a generally serpentine path and in a generally rearward direction. Such movement of the air through the furnace section and, also, through the preheating section is further influenced by the exhaust blower unit or fan 295 (Figure 7–B).

It should be noted that the floor 205 and tracks 30 not only extend throughout the length of the preheating section B, but also extend throughout the length of the subsequent sections C, D, E and F of the kiln. The arcuate or curved roof terminates at its forward end (Figure 7–F) at the discharge end of the slow cooling or annealing section E and a substantial portion of the front portion of the roof 296 serves as a false ceiling defining the lower wall of a hot air collecting chamber generally designated at 325 (Figures 7–E, 7–F and 21). Since the fast cooling and slow cooling sections D, E of the kiln are very closely inter-related, a combined detailed description of these two sections will now be given.

*Fast cooling and slow cooling sections*

The construction and purpose of the live air cooling cells 51, 51a, the cross-flow blower units 60, 60a and the baffles 61, 61a, 64 and 64a in the fast and slow cooling sections D, E has already been disclosed. It has also been described how the platforms 267, 267a extend through the fast and slow cooling sections. It is apparent, by referring to Figures 7-E and 18, that both the live and dead air cells 50, 51, 50a and 51a are formed above the corresponding portions of the platforms 267, 267a and are closed at their upper ends by the roof 296.

In order to insure that the ware W is uniformly cooled at a relatively fast rate from a temperature of, say, 2020° F. down to a temperature of, say 1200° F., three openings 330, 331, 332 are provided in the portion of the roof 296 between the cooling panels 45, 45a (Figures 7-E, 17, 18 and 20). The vent or opening 330 is disposed adjacent and between the front portions of the cooling panels 45, 45a and is relatively narrow and extends longitudinally of the roof 296, substantially in the center thereof as shown in Figures 7-E, 17 and 18. The vents or openings 331, 332 are spaced from each other forwardly of the opening 330 and are also relatively narrow but are elongated to the extent that they extend transversely of the roof 296 and opening 332 is substantially the same length as the distance between the cooling panels 45, 45a.

The longitudinally extending rear opening 330 has a plurality of closely spaced transverse air deflecting members 333 positioned therein whose rear surfaces curve rearwardly and downwardly as shown in Figure 7-E so as to tend to direct air which is forced downwardly therebetween, in a manner to be later described, rearwardly or in the opposite direction in which the ware moves through the kiln. A manifold member or hood, preferably made from sheet metal, 336 is positioned above the opening 330 and has one end of a relatively small branch pipe or conduit 337 communicatively connected thereto.

It will be noted that the front portions of the lateral openings 331, 332 in the roof 296 are also each provided with an air deflecting member 337 therein which extends transversely of the roof 296 throughout the length of each of the openings 331, 332 and which is also provided with a downwardly and rearwardly curved portion to direct air currents downwardly and rearwardly as they are directed therethrough. A hood 340, preferably made from sheet metal, is also positioned above each of the lateral openings 331, 332 and each of the hoods has the lower end of a corresponding relatively small conduit or pipe 341 connected thereto.

The pipes or conduits 337, 341 extend upwardly and are communicatively connected to a main conduit 343 spaced substantially above the corresponding portion of the roof 296 and being suitably supported on standards 344 whose lower ends are fixed to the roof 296. The rear end of the main conduit 343 also has a pair of branch pipes or conduits 345, 345a communicatively connected thereto which diverge downwardly and rearwardly at an angle and then extend downwardly in substantially vertical planes (Figures 7-E, 17 and 18) outwardly of the side walls 46, 46a of the fast cooling section D and then curve inwardly toward each other where they communicate with respective openings 346, 346a formed in the respective side walls 46, 46a and which, in turn, communicate with the respective fast cooling chambers 51, 51a (Figure 18).

In order to maintain the temperature in the fast cooling section D within predetermined limits, at that portion approximately centrally located relative to the rotary zone of the air as effected by the cross-flow blower units or fans 60, 60a (Figures 6-E and 7-E), a suitable thermo-couple instrument or thermostatic switch 347 depends from or is positioned in the roof 296 substantially at the mean center thereof between the air circulating blowers 60, 60a. This thermo-couple unit 347 is normally adapted to open and close upon relatively slight variations in the temperature of the surrounding air above and below approximately 1200° F. in the processing of brick, for example. The thermo-couple unit 347 is interposed in an electrical circuit to a pair of reversible electric motors 350, 350a (Figures 18 and 19) which operate respective butterfly dampers 351, 351a loosely mounted in the inwardly projecting lower portions of the branch pipe or conduits 345, 345a.

The electric motors 350, 350a are suitably secured to the outer surfaces of the respective side walls 46, 46a. Each butterfly valve or damper 351, 351a has a shaft $s$ depending therefrom and journaled in the lower cell of the inwardly projecting portion of the corresponding one of the branch pipes 345 and 345a and the lower end of each of the shafts $s$ has a pulley $t$ fixed thereon which is engaged by an endless belt $u$ which also engaged a pulley $r$ fixed on the upwardly projecting shaft of the corresponding one of the electric motors 350, 350a.

By the way of illustration, it is shown somewhat schematically in Figure 19 how the motors 350, 350a for controlling the respective butterfly dampers 351, 351a may be positioned in a circuit with the thermo-couple unit 347. Since this circuit may be arranged substantially the same as the circuit for the damper A-14 in Figure 27, a further description thereof is deemed unnecessary. It is apparent that, however, upon the temperature in the fast cooling section D dropping below a predetermined minimum, the thermo-couple unit 347 closes a circuit to one side of the motors 350, 350a which, in turn, open the respective butterfly dampers 351, 351a. Conversely, when the temperature of the air in the fast cooling section D reaches a predetermined maximum, the thermo-couple unit 347 reverses the circuit to the electric motors 350, 350a to open the butterfly dampers 351, 351a. Of course, the control unit A-25b functions like control unit A-25 (Figure 27) to break the circuit to the electric motors whenever the butterfly dampers 351, 351a are moved to a desired position.

It will be observed in Figures 6-D, 6-E, 7-D and 7-E that the side walls 46, 46a at the fast cooling and slow cooling zones E, D, are provided with access openings 369 which are normally closed with loosely stacked brick or other means, not shown. The rearmost of the openings 369 also extend through the cooling panels 45, 45a.

*Hot air collecting chamber*

As heretofore stated, the front portion of the roof 296 at the slow cooling section E serves as the bottom of the hot air collecting chamber 325. In order to insure that the ware W is cooled at a relatively slow rate as it passes through the slow cooling or annealing section E, the air collecting chamber 325 is relatively long; that is, it is shown as being equal to the combined length of approximately five of the kiln cars 10 in the proportions shown in the drawings, for example. Of course, the size of the air collecting chamber 325 may vary depending upon the type of articles being processed, the size of the openings in the bottom wall of the air collecting chamber, the capacity of the blower means associated therewith, etc.

Referring to Figures 7-E, 7-F, 20 and 21, it will be observed that the air collecting chamber 325 comprises rear and front transverse walls 370, 371 whose lower edges conform to and are supported upon the curved roof 296 and a pair of longitudinally extending side walls 372, 372a. As best shown in Figure 21, it will be observed that the side walls 372, 372a of the air collecting chamber 325 are actually upwardly extending portions of the respective side walls 46, 46a defining the slow cooling zone E of the kiln. The upper end or top of the air collecting chamber 325 is closed by means of a roof panel 373 supported on the end walls 370, 371 and side walls 372, 372a.

The portion of the roof 296 defining the bottom of the air collecting chamber 325 is provided with a plurality of longitudinally spaced relatively narrow transverse slots 374 therein. As best shown in Figure 21, the upper end of each of the slots 374 is surrounded by a housing of substantially the same inner dimensions as the slots 374 and which is open at its upper end and is provided with a hinged cover or damper 376. The hinged covers or dampers 376 are individually opened or closed, usually by experimentation, according to the temperature requirements of the particular area immediately therebeneath. For example, in the processing of brick, it has already been stated that the preferred temperature of the air in the furnace section C is preferably maintained at approximately 2020° F. and, as each successive kiln car 10 passes through the fast cooling or precooling section or zone D, the temperature of the ware W or brick is rapidly decreased or reduced from said 2020° F. to approximately 1200° F.

It should be noted at this point that most of the air in the fast cooling section D, that is, from the rear ends of the cooling panels 45, 45a to the baffles 61, 61a (Figures 6–D and 6–E), remains confined in the fast cooling zone D and is circulated by the cross-flow blower units or fans 60, 60a in a substantially rotary path. The air in the fast cooling section D is heated by the heat radiated from the brick and very little if any temperature rise of the air in the fast cooling section is caused by the burners 35 in the furnace section C, since the baffles 37 in the furnace section and the exhaust fan or suction means 295 adjacent the ingress end of the preheating section B (Figure 7–B) cause air heated by the burners 35 to move rearwardly or in the opposite direction from that in which the kiln cars 10 are moved. Further, the fact that the cooling panels 45, 45a are disposed in close proximity to the ware or brick passing therebetween assists in preventing heated air in the furnace section C from flowing into the fast cooling section B.

Now, as the ware or brick, at a temperature of approximately 1200° F., moves into the slow cooling or annealing section E, the temperature of the ware or brick is gradually reduced from said 1200° F. to approximately 800° F. Accordingly, when the kiln is originally "set up" for processing a particular type of ware, a plurality of longitudinally spaced thermo-couple instruments or thermometers 380 (Figure 7–F) are positioned along the portions of the side walls 46, 46a defining the slow cooling zone or section E or are positioned to depend from corresponding portions of the roof 296 to indicate the temperature of the areas beneath the corresponding slots 374 and to indicate which, if any, of the covers 376 for these slots 374 should remain closed and which of these slots 374 should remain open to effect the desired gradual reduction in temperature of the air from the ingress to the egress ends of the slow cooling or annealing section or zone E.

A suitable access opening may be provided in the rear wall 370 to facilitate opening or closing of the dampers or covers 376 for corresponding slots 374, if desired. Referring to Figures 1, 2, 3, 17 and 18, it is apparent that the front end of the duct 273 is connected to the rear wall 370 for communication with the interior of the hot air collecting chamber 325. Also by referring to Figures 1, 2, 3, 7–E, 17 and 18, there will be observed a centrifugal-type blower unit broadly designated at 385 which may be of the same type as that indicated at 31 in Figures 1, 2, 3 and 7.

The centrifugal blower unit 385 is suitably supported upon the roof 296 rearwardly of the rear wall 370 of the air collecting chamber 325 and the intake side thereof is coupled to the rear wall 370 of the air collection chamber 325 by means of a duct 386 which communicates with the interior of the air collecting chamber 325 and has an opening on one side thereof provided with a suitable manually operable damper 387 therein which is shown somewhat schematically in Figures 7–E and 17. The damper 387 is preferably the same as the damper 177 and its housing 174 shown in Figures 7–A and 12 and, accordingly, a detailed illustration and description thereof is deemed unnecessary. The exhaust or discharge end of the centrifugal blower 385 has the rear end of the conduit 343 communicatively connected thereto. The impeller of the blower 385 is driven continuously during the use of the kiln and, since the blower 385 may be identical to the blower 31, a further description thereof is deemed unnecessary.

It is thus seen that air in the air collecting chamber 325 is not only heated due to radiation of heat from the ware passing therebeneath, but the heated air is also caused to flow into the chamber 325 from the ware passing therebeneath by the blower units 175 and 385, since, as heretofore stated, the blower unit 175 causes the air to flow from the air collecting chamber 325 through the conduit 173 and into the drying section A of the tunnel kiln. Also, the blower 385 draws heated air from the air collecting chamber 325 and causes it to flow into the cooling cells 51, 51a as well as through the openings 330, 331, 332 in the roof of the fast cooling section.

Due to the relatively high temperature of the ware as it initially enters the fast cooling section D, the damper 387 (Figures 7–E and 17) is at least partially open at all times in order that the air outside of the kiln is also drawn into the duct 386 to be mixed with heated air from the collecting chamber 325 to further insure that the temperature of the air in the fast cooling section can be maintained within the desired limits, since the butterfly valves 351, 351a (Figure 18) can only vary the rate at which the air enters the cooling cells 51, 51a and, accordingly, can only cause relatively slight variations in the temperature of the air in the cells 51, 51a.

The extent to which the damper 387 of Figures 7–E and 17 is open depends, to a considerable extent, upon the temperature of the outside air. In other words, it is apparent that the damper 387 may have to be completely opened on extremely hot days and, on extremely cold days, with the outside temperature possibly several degrees below freezing, it may be desirable to substantially close the damper 387. Here again, it is contemplated that suitable means may be provided for opening and closing the damper 387 automatically under control of the thermo-couple instrument 347, without departing from the spirit of the invention.

Although the cross-flow fans or blower units 60, 60a (Figures 6–E and 7–E) cause a predominantly rotary motion of the air in the forward portion of the fast cooling section D, it is apparent that, due to the air being withdrawn from the air collecting chamber 325 by the blower units 175, 385 (Figures 7–A and 7–E) a relatively slow counterclockwise flow of the air is caused in Figure 7–E by the blower units or fans 175, 385 so the air within the forward portion of the fast cooling section and within at least the rear portion of the slow cooling section is caused to move in a generally forward direction and is also caused to move in a generally serpentine path within the rear portion of the slow cooling or annealing section E. Due to the baffles 64, 64–A therein, it is apparent that there is a conflicting flow of air in the fast cooling section and in the slow cooling section which is highly desirable due to the turbulence created thereby, since this turbulence insures that the ware throughout each stack thereof is cooled uniformly as the ware moves through the fast cooling and slow cooling sections.

Final cooling section

The final cooling section F is best shown in Figures 6–F, 7–F, 21 and 22. The final cooling zone or section F is also referred to as an atmospheric cooling zone or section, since the ware is cooled to a temperature suitable for manually handling the same or to normal room temperature of from 70° F. to 90° F., although the temperature of the air outside of the kiln may be considerably lower or may even be below freezing. The final cooling panels 65, 65a and final cooling air passage chambers 66, 66a have previously been briefly described and a more detailed description thereof will now be given.

As heretofore stated, the foraminated final cooling panels 65, 65a are disposed closely adjacent the path of movement of the ware thereby and the openings in each of these panels 65, 65a are preferably defined by louvers 390 which may be formed from horizontal rows of closely spaced brick which extend inwardly and rearwardly at an angle from the corresponding air passage chambers 66, 66a so as to tend to direct air rearwardly therebetween toward the slow cooling section E. It will be observed in Figures 6-F, 7-F and 22 that the platforms or tables 267, 267a support the foraminated final cooling panels 65, 65a and serve as the bottoms of the respective chambers 66, 66a. The front ends of these chambers are closed by the front wall 70 of the final cooling section F and the rear ends of the chambers 66, 66a are closed by rear wall members 391, 391a.

The rear portion of the final cooling section F is provided with a roof 392 thereon which is shown as being substantially flat and whose lower surface is disposed on substantially the same level as the lower surface of the apex of the curved roof 296. The upper edges of the final cooling panels 65, 65a and the rear walls 391, 391a of the air passage chambers 66, 66a are also disposed immediately beneath the lower surface of the roof 392. It will be observed in Figure 7-F that the front end of the roof 392 terminates in substantially spaced relation rearwardly of the front wall 70 of the final cooling section F and a rear wall 394 of a cupola or primary final cooling air chamber 395 extends upwardly from the front end of the roof 392 and supports the rear edge of a roof 396 for the primary final cooling chamber 395.

The roof 396 is also supported on upwardly extending portions 46b, 46c at the forward ends of the respective side walls 46, 46a of the final cooling section per se (Figures 7-F and 22). The front wall 70 extends upwardly substantially above the level of the roof 392 to also serve as the front wall of the primary final cooling air chamber 395 and to support the roof 396 as shown in Figures 5, 7-F and 22. It will be observed in Figures 7-F and 22 that the primary final cooling chamber 395 is disposed above and communicates with the air passage chambers 66, 66a.

The distance between the walls 70, 374 of the primary final cooling air chamber 395 is shown in Figure 7-F as being substantially less than the length of the cooling panels 65, 65a and a false ceiling or horizontal partition 397 is mounted upon and spans the distance between the front portions of the foraminated final cooling panels 65, 65a and separates the area of the final cooling section through which the ware passes from the primary final cooling air chamber 395. The horizontal panel or ceiling 397 is provided with relatively large transversely extending openings 400 therein to permit air passage therethrough. The roof 392 supports a suitable blower means or fan preferably in the form of a centrifugal blower unit indicated at 401. This blower unit 401 is preferably of substantially the same type as the blower unit 175 in Figure 7-A and also has a constantly driven impeller therein, not shown. Since the structure of centrifugal-type blowers is well known, a detailed description thereof will not be given.

It will be noted that the rear wall 394 of the final cooling air chamber 395 is provided with an opening 405 therein with which the discharge end of the blower 401 communicates. The intake side of the blower 401 has a hollow damper housing 406 communicatively attached thereto (Figure 21) in which a sliding-type damper or plate 407 is positioned and which may be manually adjusted to control the volume of air forced into the chamber 397 by the blower unit 401.

Communicatively attached to the outer end of the damper housing 406 in Figure 21 is a substantially rectangular duct or extension 410 which extends laterally of the longitudinal axis of the kiln and to which the front end of a relatively small conduit or pipe 411 is communicatively connected. The rear end of the pipe 411 (Figures 7-F, 21 and 21-A) is connected to the front wall 371 of the air collecting chamber 325 for communication with the latter chamber. The end of the duct 410 remote from the intake side of the blower unit 401 is open and is preferably covered with a suitable grid or screen 415.

A door or damper plate 414 is hingedly connected to the rear wall of the duct 410 (Figure 21-A) and is disposed within the duct 410. It will be noted that the door or damper plate 414 is located between the open outer end of the duct 410 and the pipe or conduit 411 and, since the preponderance of the air to be introduced into the primary final cooling air chamber 395 would normally be obtained from the surrounding atmosphere, the door 414 is generally substantially opened and, when fully opened relative to the open outer end of the duct 410, the door 414 closes the front end of the conduit 411 so the conduit 411 will not transmit hot air from the collecting chamber 325 into the duct 410. On the other hand, if it is relatively cool outside the kiln, then the door or damper plate 414 may be positioned to permit a predetermined amount of hot air to flow from the collecting chamber 325 through the pipe 411 into the duct 410, where it mixes with the cool outside air to heat the same. Thus, the temperature of the air entering the primary final cooling chamber 395 may be predeterminedly controlled, since the blower unit 401 forces the air at room temperature into the primary final cooling chamber 395.

It is apparent that, as the air at room temperature enters the primary final cooling chamber 395, it flows through the openings 400 in the false ceiling 397 as well as into the air passage chambers 66, 66a and, thus, through the foraminated final cooling panels 65, 65a to finally reduce the temperature of the ware from, say, the 800° F. to which it is cooled in the slow cooling or annealing section E, to a temperature of approximately 70° F. Since air is drawn from the air collecting chamber 325 by the fans or blower units 175 (Figure 7-A) and 385 (Figure 7-E) and, also, in some instances, by the blower unit 401 (Figure 7-F), it is apparent that as the air enters the final cooling section or zone F through the side panels 65, 65a and the false ceiling 397, it also flows rearwardly in a somewhat serpentine path where it at least partially mixes with the relatively hotter air in the slow cooling zone or section E and flows back upwardly through the slots 374 into the hot air collecting chamber 325.

The kiln car tracks 30 preferably extend a substantial distance beyond the discharge end of the kiln (Figures 6-F and 7-F), and the door means 72, which is normally closed, is opened by an operator as the forward end of each successive kiln car 10 approaches the same in the final cooling section F. The kiln car 10 with the heat-treated brick or other ware thereon is then quickly moved away from the immediately succeeding car through the egress opening 71 at the discharge end of the kiln, whereupon the door means 72 is again closed until the front end of another car approaches the same. Each successive car may be quickly withdrawn from the discharge end of the kiln either manually or by means of any suitable tractor or the like, as is customary. The opening 71 (Figures 6-F and 7-F) is also provided with a threshold 71a similar to the threshold 80a.

Due to the fact that the leading car, in each instance, is moved away from the next succeeding car at the discharge end of the kiln, it will be observed in Figures 6-F, 7-F and 22 that a suitable central dam 420 is provided between the tracks 30 in the final cooling zone F. Also, auxiliary side dams 421, 421a are provided adjacent opposite sides of the tracks 30. It will be observed in Figure 22 that the central dam 420 is in the form of a block which is substantially rectangular in cross-section, and the side dams 421, 421a are formed integral with the projections 265, 265a and their upper inner surfaces are shaped to conform substantially to the lower outer surfaces of the transverse skirts 260 depending from the forward ends of the beds 12 of the kiln cars 10 (Figure 14).

Referring to Figures 6-B, 7-B and 14, it will be observed that central and side dams 422, 423, 423a, which are substantially identical in cross-section to the respective air dams 420, 421, 421a (Figure 22), are provided immediately forwardly of the cylinder 237. In each instance, these sets of dams 420, 421, 421a (Figure 22) and 422, 423, 423a are equal to or greater than the length of any one of the kiln cars 10. It will be observed in Figure 14 that the central dam, in each instance, is so shaped that the central portions of the axles 86, 87 between the wheels 90, 91 will pass over the upper surfaces of the central dams 420, 422.

Now, the rear set of dams 422, 423, 423a is provided because of the fact that, before each successive kiln car is transferred from the air lock L into the rear end of the preheating section B, portions of the tracks 30 between the foraminated air exhaust panels 280, 280a are exposed, so the relatively high heat in that zone of the preheating section would pass beneath the kiln cars. However, since the skirts 260 on the front ends of the kiln cars 10 conform substantially to the shape of the dams 422, 423, 423a, it is apparent that air is prevented from flowing forwardly beneath any of the cars forwardly of the then rearmost car on the tracks 30. The same condition exists at the foremost end of the kiln whenever a leading car is quickly withdrawn through the egress or discharge opening 71 in the front walls 70 of the kiln and, of course, the dams 420, 421, 421a (Figures 6-F, 7-F and 22) prevent the hot air or warm air from flowing from the final cooling section rearwardly beneath the succeeding kiln cars 10.

Also, means, to be presently described, are provided for admitting cool, outside air into the area beneath the kiln cars 10 between the front and rear sets of dams and, accordingly, the front and rear sets of dams prevent the cold air from passing from beneath the kiln cars 10 into the remote end portions of the preheating and final cooling sections B, F and, thus, mixing with the air throughout the length of the series of sections B, C, D, E and F.

In order to insure that the space between the beds 12 of the kiln cars 10 and the floor 205 is kept cool, particularly as the ware on the cars is baked in the furnace section C, it will be observed in Figures 1, 3, 7-C and 16 that the lower portions of the side walls 32, 32a and 33, 33a of the preheating and furnace sections B, C are each provided with a plurality of openings 425 therein which extend through the corresponding projections 265, 265a. These openings 425 are preferably provided below certain burner units 35 and it will be observed in Figure 16 that the upper walls of these openings 425 are necessarily disposed below the level of the corresponding sand troughs 271, 271a so the cold air from outside the kiln cannot enter the area above the beds 12 of the kiln cars 10.

It will be noted that the air may circulate through the openings 425 to assist in maintaining the area beneath the car beds 12 cool and to thereby prevent damage to the bearings in which the axles 86, 87 of the kiln cars 10 are journaled, as would be the case if the bearings were subjected to the high heat necessary in the furnace zone. The cross-ties 206 are exposed above the floor 205 to permit the cool air to circulate around the tracks 30.

From the foregoing description, it is apparent that the cross-flow or serpentine flow principle may be applied to heat-treating apparatuses or kilns for processing two or more rows of kiln cars or two or more streams of ware simultaneously. By way of example, a modified form of the invention is illustrated in Figures 28, 29, 30 and 31 wherein the principles of the present invention are shown as applied to a drying section only. However, it is to be distinctly understood that the principles of the present invention, as embodied in Figures 28 to 31, inclusive, may be as readily applied to similar preheating, furnace, fast, slow and final cooling sections, and it is deemed unnecessary to provide a complete description of the latter sections for processing two or more rows of brick or the like, since most of such disclosure or description would merely be a repetition of the description already given with respect to the preheating, furnace, fast cooling, slow cooling and final cooling sections B, C, D, E and F heretofore described.

*Modified form of the invention for processing two or more parallel rows of brick or the like*

As heretofore stated, the principles of the present invention as applied to the modified form of the invention shown in Figures 28 to 31, inclusive, are typical of their application to other sections of a kiln of the character heretofore described, although the description hereinafter shall be given with respect to a drying section only.

Since many of the elements shown in Figures 28 through 31 are substantially the same or identical to elements shown in Figures 6, 6-A, 7-A, 7, 10, 11 and 12, similar elements in Figures 28 through 31 will bear the same reference characters with the prime notation added, in order to avoid repetitive description.

In Figures 28, 30 and 31 the side walls 14', 14a' are spaced substantially further apart than the side walls 14, 14a in Figures 6, 6-A, 10, 11 and 12 so as to accommodate at least two sets of substantially parallel kiln car tracks 11' and 11'' which are secured upon the floor 80'. The rear wall 82' of the modified form of the drying section A' is provided with two ingress openings 83', 83'' (Figures 28 and 29) which may be opened or closed by respective door means 84', 84''. Kiln cars 10', 10'', which may be identical to the kiln cars 10, heretofore described, are fed, one at a time, through the respective ingress openings 84', 84'' onto the respective pairs or sets of kiln car tracks 11', 11''. The kiln cars 11', 11'' (Figure 30) support respective tiers or stacks of brick or other ware, respectively designated at W' and W''.

As the kiln cars 10', 10'' are moved into the drying section A', their distal portions pass adjacent the respective walls 120', 120a' and the respective tables or platforms 21', 21a'. The proximal surfaces of the kiln cars 11', 11'' are spaced substantially from each other and move adjacent opposite sides of an intermediate or central table or platform 430 and a pair of spaced longitudinally extending wall members 431, 432. The platform 430 is preferably disposed on substantially the same level as the platforms 21', 21a'. The platform 430, the walls 431, 432 and floor 80' form an intermediate hot air channel 433 which is similar to, and serves the same purpose as, the channels 13', 13a'. The central table or platform 430 has a plurality of longitudinally spaced upright columns or baffles 435 mounted thereon and extending upwardly to the roof 167'.

Now, although the baffles 16' projecting inwardly from the side wall 14' are staggered relative to the baffles 16' projecting inwardly from the opposite side wall 14a', it will be observed in Figure 28 that there is one of the baffles or columns 435 spaced opposite each of the baffles 16' on both of the side walls 14', 14a'.

A cross-flow fan or blower unit 437 is located above the table 430 immediately forwardly of each of the columns or central baffles 435 and alternate central cross-flow fans or blower units 437 direct air across and above the tracks 11' while the intervening cross-flow fans or blower units 437 direct air in the opposite direction from said alternate cross-flow fans. It will be noted that the central cross-flow fans 437 are spaced in substantial alinement with corresponding outer cross-flow fans 15' and, in each instance, the central cross-flow fan 437 corresponding to any one of the outer cross-flow fans 15' directs air in the same direction as air is directed by the corresponding outside fan 15' so air is caused to flow entirely across the kiln at each of said outside fans 15' and then along the opposite wall and back across the kiln, by the next succeeding outside cross-flow fan 15'.

By way of example, the outside and central cross-flow fans 15', 437 in the extreme right-hand portion of Figure 28 direct air from the wall 14' toward the wall 14a', whereupon the air passes rearwardly along the wall 14a', under the influence of the suction means 31' of Figure 25, and then the next succeeding outside cross-flow fan 15' rearwardly of the lateral planes of the previously-mentioned cross-flow fans 15', 437 will cause the air to flow from the wall 14a' across to the wall 14', etc. Here again, it is apparent that the baffles 16' and 435 also assist in directing the air across the kiln so the air flows in a serpentine path from the forward end of the drying section A' to the rearward end thereof.

Now, in order to insure that the hot dry air directed into the hot air introducing chamber 165' above the front portion of the drying section A' is directed toward both sides of the ware W', W''', in each instance, as the ware approaches the front or egress end of the drying section A', it will be observed in Figures 28 and 31 that a central hot air distributing chamber 440 communicates with the hot air distributing chamber 165' and is defined by a pair of closely spaced foraminated heating panels 441, 442 which are supported on the floor 80' and are spaced inwardly from the respective outside heating panels 160', 160a' which define the respective chambers 161', 161a'. It is apparent by observing Figures 28 through 31 that the central or intermediate hot air channel 433 communicates with the central hot air distributing chamber 440 and, of course, the lower portions of the foraminated heating panels 441, 442 are formed as forward extensions to the wall members 431, 432 which define the central or intermediate hot air channel 433.

It will be observed in Figures 29 and 31 that the upper edges of tht adjacent heating panels 160' 441 and the upper edges of the adjacent heating panels 160a' and 442 are each spanned by a false ceiling or roof 170', and each of these roofs or false ceilings 170' is provided with a plurality of slots or openings 171' therein so that hot dry air is caused to flow into the hot air introducing chamber 165' from the blower unit 175', through the openings 171' in the roofs or false ceilings 170', into the distributing chambers 161', 161a' and 440 and, thus, through the corresponding heating panels 160', 160a' 441 and 442 to circulate through the ware W' and W'' from both sides and from the top in each instance. Of course, a substantial amount of hot air is also directed into each of the hot air channels 13', 13a' and 433 from the respective chambers 161', 161a' and 440 so that hot dry air can be admitted into that area of the drying section A' through which the ware W', W'' passes by manually controlling the dampers 22' beneath each of the outside cross-flow fans or blower units 15' resting upon the platforms 21', 21a' beneath the corresponding cross-flow fans or blower units 15'.

The central platforms or table 430 is also provided with an opening 445 therein adjacent each of the central cross-flow fans or blower units 437. The effective size of the openings 445 may each also be controlled by a plate or damper 446 provided with a suitable handle 447 thereon for manipulation by an operator. As heretofore stated, the dampers 22' and 446, in each instance, determine the size of the corresponding openings in the tables or platforms 21', 21a' and 430 which, in turn, determines the relative humidity of the air within the corresponding portions of the drying section A'.

The intermediate or central cross-flow fans 37 may be of any desired construction and may be supported in any desired manner. As best shown in Figure 30, each of the intermediate cross-flow fans or blower units 437 comprises a bearing housing 450 which is suspended from the roof 167' by a suitable framework 451 and in which a shaft 452 is journaled. One end of each shaft 452 has a suitable propeller 453 fixed thereon and the other end of the shaft 452 has a pulley 454 fixed thereon.

The pulley 454 is engaged by an endless belt 455 which extends upwardly through a suitable opening provided therefor in the roof 167' and engages a pulley 456 fixed on the shaft of an electric motor 457 which may be continuously energized during the processing of the ware W', W''. The motor 457, in each instance, may be suitably secured upon the roof 167'.

It is thus seen that I have provided a novel method of an apparatus for heat-treating articles, and particularly, drying, baking and cooling brick and similar ceramic materials, wherein the cross-flow or serpentine flow of air currents is effected and the heat and humidity of the various sections of the apparatus may be controlled within limits to an extent heretofore unattainable.

In the annexed claims, the terms "forwardly" and "rearwardly" are used in the sense that the ware moves through the kiln in a forward direction.

In the drawings and specification there has been set forth a preferred embodiment of the invention and, although specific terms are employed, they are used in a generic and descriptive sense only and not for purposes of limitation, the scope of the invention being defined in the claims.

I claim:

1. An elongated tunnel-like kiln having side walls and including a drying section, a preheating section, a baking section and at least one cooling section, individual means to induce a horizontal and generally serpentine flow of air currents in each the drying, pre-heating and baking sections and generally toward one end of the kiln, means to introduce heated air from the cooling section into the end of the drying section adjacent the pre-heating section, means to superheat air in the baking section, means to introduce hot air from a medial portion of the cooling section into a portion of said cooling section immediately adjacent the baking section, manually controlled means to mix outside air with the air from the medial portion of the cooling section whereby said portion of the cooling section may be maintained at a selected temperature such as to prevent damage to artcles passing therethrough and thereby to rapidly reduce the temperature of articles moved from the baking section into the cooling section, and means gradually and progressively reducing the temperature of the air in the medial portion of the cooling section from the end of said medial portion nearest said one end of the kiln toward the other end of the kiln to thereby anneal articles passing therethrough after having been rapidly cooled prior to movement thereof into said medial portion of the cooling section.

2. A kiln comprising an elongated walled enclosure, said enclosure including serially arranged drying, preheating, tempering, fast-cooling, slow-cooling and final cooling sections, the distal ends of the drying and final cooling sections being open and being provided with respective door means for closing said open distal ends, all of said sections being intercommunicable, door means interposed between the proximal ends of the drying and preheating sections for selectively preventing communication between the latter sections, means for heating air within the tempering section, means to successively advance articles longitudinaly through the serially arranged sections, said sections being provided with side walls, said means for heating the air in the tempering section including blower means for feeding air into the tempering section as it is heated, suction means adjacent the ingress end of the preheating section for exhausting air from the preheating section, each of said side walls of the preheating and tempering sections being provided with a plurality of spaced baffles thereon with the baffles on one side wall being staggered relative to the baffles on the other side wall whereby the air heated in the tempering section moves in a generally serpentine path toward and through the preheating section as it is exhausted by said suction means, baffle means on opposite walls of the fast cooling section, blower means on opposite walls of the fast cooling section so arranged as to cause generally rotary movement of the air currents therein, an air collecting chamber above the slow cooling section, a false ceiling between the slow cooling section and the air collecting chamber and being provided with slots therein whereby the heat from the articles flows upwardly into the air collecting chamber, means for forcing hot air from the air collecting chamber into the discharge end of the drying section, means for forcing hot air from the air collecting chamber into the fast cooling section and for mixing outside air with the air from the air collecting chamber thereby to cool the articles rapidly with movement thereof through the fast cooling section, means for forcibly exhausting air from the ingress end of the drying section, and opposite side walls of the drying section each being provided with a plurality of baffles and a plurality of cross-flow fans, there being one of said cross-flow fans disposed adjacent each of certain of said baffles, and the baffles on one side wall of the drying section also being staggered relative to the baffles on the other side wall of the drying section.

3. Apparatus for heat-treating stacks of articles comprising a tunnel-like enclosure, means to support and move stacks of articles forwardly through the enclosure, said enclosure including a tempering section and a cooling section forwardly of and communicating with the tempering section, means for heating and tempering articles as they pass through the tempering section, said cooling section comprising a pair of side walls spaced substantially further apart than the width of the stacks of articles moving therebetween, a pair of cooling chambers disposed adjacent the rear end of the cooling section at its juncture with the tempering section and also disposed adjacent opposite sides of the path of travel of the stacks of articles, said chambers including a pair of spaced cooling panels having their proximal inner surfaces disposed closely adjacent the path of travel of the stacks of articles, said cooling panels being spaced substantially rearwardly from the front end of the enclosure, means for introducing heated air into the chambers and at a temperature substantially less than the temperature of the articles, as they pass from the tempering section into the cooling section, for cooling said panels whereby the panels cool the air heated by radiation from the stacks of articles passing therebetween, a pair of substantially transversely alined baffles projecting inwardly from opposite side walls of the cooling section and spaced forwardly of the front ends of said cooling panels, the front ends of said cooling chambers having openings therein whereby the air introduced into the cooling chambers may flow into the cooling section forwardly of said cooling chambers, and blower means disposed between the front ends of the cooling chambers and the rear surfaces of the baffles for effecting a generally rotary flow of the air thereat.

4. A structure according to claim 3 wherein said cooling section is provided with an air collecting chamber, communicative means between the collecting chamber and a portion of said cooling section spaced forwardly from said cooling panels, said means for introducing air into the cooling chambers including conduit means connecting the air collecting chamber with said air cooling chambers, means for forcing air to flow from the collecting chamber into the cooling chambers, and means for controlling the rate of flow of the air from the collecting chamber into the cooling chambers.

5. A structure according to claim 4 including manually controlled means for mixing outside air with the air flowing from the collecting chamber into the cooling chambers whereby the air flowing into the cooling chambers is maintained at a temperature lower than that of the air as it is drawn from the collecting chamber.

References Cited in the file of this patent

UNITED STATES PATENTS

| | | |
|---|---|---|
| 1,223,732 | Reams | Apr. 24, 1917 |
| 1,246,148 | Owens | Nov. 13, 1917 |
| 1,505,768 | Dressler | Aug. 19, 1924 |
| 1,531,181 | Harrop | Mar. 24, 1925 |
| 1,590,462 | Wilson et al. | June 29, 1926 |
| 1,610,968 | Robertson | Dec. 14, 1926 |
| 1,624,204 | Baily | Apr. 12, 1927 |
| 1,701,223 | Bergman | Feb. 5, 1929 |
| 1,768,486 | Ogden | June 24, 1930 |
| 1,874,516 | Hartford | Aug. 30, 1932 |
| 2,088,554 | Robson et al. | July 27, 1937 |
| 2,238,791 | Dorsey | Apr. 15, 1941 |
| 2,335,128 | Merrill | Nov. 23, 1943 |

FOREIGN PATENTS

| | | |
|---|---|---|
| 13,386 | Great Britain | A.D. 1898 |
| 177,561 | Great Britain | Mar. 29, 1922 |
| 304,016 | Germany | Feb. 16, 1918 |